US011554819B2

(12) United States Patent
Steiner et al.

(10) Patent No.: US 11,554,819 B2
(45) Date of Patent: Jan. 17, 2023

(54) WALK-BEHIND TRACTOR WITH INCREASED GROUND CLEARANCE

(71) Applicant: Tilmor LLC, Dalton, OH (US)

(72) Inventors: Glenn M. Steiner, Dalton, OH (US); Chad R. Badger, Fredericksburg, OH (US); Douglas L. Zehr, Orrville, OH (US)

(73) Assignee: TILMOR LLC, Dalton, OH (US)

( * ) Notice: Subject to any disclaimer, the term of this patent is extended or adjusted under 35 U.S.C. 154(b) by 463 days.

(21) Appl. No.: 16/810,489

(22) Filed: Mar. 5, 2020

(65) Prior Publication Data

US 2021/0276635 A1 Sep. 9, 2021

Related U.S. Application Data

(60) Provisional application No. 62/984,605, filed on Mar. 3, 2020.

(51) Int. Cl.

| | |
|---|---|
| ***B62D 51/06*** | (2006.01) |
| ***B60K 17/22*** | (2006.01) |
| ***B60G 17/00*** | (2006.01) |
| ***B60D 1/01*** | (2006.01) |
| ***A01B 59/06*** | (2006.01) |
| ***F16H 7/06*** | (2006.01) |
| ***F16H 7/02*** | (2006.01) |
| ***A01B 63/00*** | (2006.01) |
| *B60S 9/02* | (2006.01) |
| *A01B 3/24* | (2006.01) |

(52) U.S. Cl.

CPC ............ *B62D 51/06* (2013.01); *A01B 59/065* (2013.01); *A01B 63/006* (2013.01); *B60D 1/01* (2013.01); *B60G 17/00* (2013.01); *B60K 17/22* (2013.01); *F16H 7/02* (2013.01); *F16H 7/06* (2013.01); *A01B 3/24* (2013.01); *A01B 63/002* (2013.01); *B60G 2300/082* (2013.01); *B60G 2500/30* (2013.01); *B60S 9/02* (2013.01)

(58) Field of Classification Search

CPC ........ B62D 51/06; B60G 17/00; B60G 17/22; B60G 2500/30

See application file for complete search history.

(56) References Cited

U.S. PATENT DOCUMENTS

| | | | | |
|---|---|---|---|---|
| 1,387,279 A * | 8/1921 | Luger | A01B 39/06 | 172/698 |
| 1,638,762 A * | 8/1927 | Donald | B62D 51/06 | 180/19.1 |
| 1,685,903 A * | 10/1928 | Bolens | A01B 69/008 | 180/19.1 |

* cited by examiner

*Primary Examiner* — Faye M Fleming

(74) *Attorney, Agent, or Firm* — Sand, Sebolt & Wernow Co., LPA

(57) ABSTRACT

A walk-behind tractor has an increased ground clearance to define a plant receiving space that has a greater height than a conventional walk-behind tractor having a straight axle. The walk-behind tractor has trailing drop arms from a frame that carry wheel axles that result in an elevated height of a driveshaft. The elevated driveshaft increases the ground clearance for taller plants to pass therebeneath during operation of the walk-behind tractor which would otherwise be too tall to pass below a conventional straight axle walk-behind tractor.

22 Claims, 14 Drawing Sheets

10
20
44
26
82
171
162
46
44
160
164
48
18
54,102
92
106
30
153
112
173
80
138
56
88
108
104
168
36
156
142
246
114
46
154
112
24
70
56
88
96
166
100
50
122
170
188
152
150
172
158
164
44
46
48
16
52,94
92
98
28

10
12
26
46
48
44
38
36
B
252
40
22
92,106
53
54
44
80
76
78,180
48
46
20
70
82
55
30
58
56
74
A
250
32
60
68
72
66
62
14

10
12
26
48
46
44
78,180
76
F
80
54
36
22
300
30
G
48
46
106
20
70
44
82
55
13
13
58
56
E
74
112
32
250
60
68
72
D
62
66
14

WALK-BEHIND TRACTOR WITH INCREASED GROUND CLEARANCE

CROSS REFERENCE TO RELATED APPLICATIONS

This application claims the benefit of U.S. Provisional Application Ser. No. 62/984,605, filed on Mar. 3, 2020; the disclosure of which is incorporated herein by reference.

TECHNICAL FIELD

The present disclosure relates generally to small agricultural machinery. More particularly, the present disclosure relates generally to a walking tractor, walk-behind tractor, or a two wheel tractor. Specifically, the present disclosure relates to a

BACKGROUND

Background Information

A "walking tractor," "walk-behind tractor," or "two wheel tractor," are synonymous terms that refer to a two-wheeled version of a four wheeled farm tractor. However, some walk-behind tractors may have four or more coaxially aligned wheels. Typically, walk-behind tractors have the ability to "run" many different kinds of implements connected to a conventional hitch on the walk-behind tractor. Additionally, some walk-behind tractors have the added benefit of the handlebars being reversible 180 degrees. This gives some walk-behind tractor front and rear power take off (PTO) capabilities.

Walk-behind tractors are capable for use on steep or rough terrain where a four wheel tractor could pose safety issues. Unlike a traditional four wheel tractor (having two front wheels and two rear wheels), using a walk-behind tractor provides the added benefit of exercise as well as being "more in touch with the earth". Additionally, the walk-behind tractor provides the ability to have one tractor that runs many different implements rather than having to own and maintain many stand alone pieces of equipment such as lawn mowers, tillers, chippers, and more. Having only one engine/power source saves time and money on engine maintenance.

Conventional walk-behind tractors have a straight axle to which the wheels are connected. Thus, the ground clearance of the conventional walk-behind tractor is measured from the ground to the lower surface of the straight axle. Typically, the ground clearance of the conventional walk-behind tractor from ground to the straight axle is typically in a range from about 6 inches to about 12 inches depending on the size of the tractor and its wheels.

SUMMARY

Although walk-behind tractor have provided the aforementioned capabilities and advantages, they are not without drawbacks. Conventional walk-behind tractors have a single fixed axle to which the two wheels are connected. Thus, the "clearance height" or ground clearance of the machine cannot be readily changed. This can be a disadvantage because different plants grow at different rates and to different ultimate heights. Thus, there may be a situation when the plants in a field "outgrow" a conventional walk-behind tractor because of the ground clearance height of the plants that need to pass below the single fixed straight axle. Thus, a need continues to exist for a walk-behind tractor with an increased ground clearance height.

In one aspect, an exemplary embodiment of the present disclosure may provide a walk-behind tractor comprising: at least two ground engaging wheels that rotate about a wheel axis and the at least two ground engaging wheels are spaced from each other, wherein the wheel axis is at a first height relative ground; a driveshaft for the ground engaging wheels located above the wheel axis at a greater second height relative to ground, wherein the driveshaft is coupled with the two ground engaging wheels to rotate the two wheels during operation of the walk-behind tractor; wherein the height of the driveshaft being above the wheel axis is adapted to provide a greater clearance height for the walk-behind tractor for plants to pass below the driveshaft and between the two ground engaging wheels during operation of the walk-behind tractor. This exemplary embodiment or another exemplary embodiment may further provide a first stub axle coupled to a first ground engaging wheel; a second stub axle coupled to the a second ground engaging wheel; wherein the first and second stub axles are coaxial along the wheel axis below the driveshaft. This exemplary embodiment or another exemplary embodiment may further provide a sprocket on the driveshaft that is positioned above another sprocket coupled with a first ground engaging wheel; and a looped mechanism coupling the sprocket with the another sprocket to effect rotational movement of the driveshaft to be imparted to the first ground engaging wheel, wherein the looped mechanism is selected from a group comprising a chain and a belt. This exemplary embodiment or another exemplary embodiment may further provide a lower surface of the drive shaft; a proximal end of a first stub axle below the lower surface of the drive shaft, wherein the proximal end of the first stub axle is offset from a longitudinal centerline; a proximal end of a second stub axle below the lower surface of the driveshaft, wherein the proximal end of the second stub axles is offset from the longitudinal centerline opposite the first stub axle; a plant receiving area defined by the proximal ends of the first and second stub axles and the lower surface of the driveshaft, wherein the plant receiving area has a height measured from the ground to the lower surface of the driveshaft and a width measured from the proximal end of the first stub axle to the proximal end of the second stub axle, and wherein the height of the plant receiving area is greater than the width.

This exemplary embodiment or another exemplary embodiment may further provide a plant receiving space defined below the driveshaft and between the two ground engaging wheels having a height of the plant receiving space that is greater than a width thereof. This exemplary embodiment or another exemplary embodiment may further provide an inverted U-shaped cross-sectional profile of a region below the drive shaft and between the two-ground engaging wheels, and the region is adapted to permit taller plants to pass below the walk-behind tractor when the taller plants would otherwise not pass below a standard walk-behind tractor with two ground engaging wheels coaxial along a standard driveshaft.

This exemplary embodiment or another exemplary embodiment may further provide an extension that is coaxially connected to an end of the driveshaft adapted to permit the two ground engaging wheels to be moved to have a greater wheelbase width. This exemplary embodiment or another exemplary embodiment may further provide a selective first position of the two-ground engaging wheels offset a first width from one another; a selective second positon of the two-ground engaging wheels offset a second width from one another; wherein selecting the second position widens a wheelbase width between the two ground engaging wheels adapted to permit the walk-behind tractor to traverse atop wider plants than would otherwise be permissible in the first position.

This exemplary embodiment or another exemplary embodiment may further provide a transverse axis defined by the driveshaft; a wheel axis about which the first and second ground engaging wheels rotate, wherein the transverse axis of the driveshaft is above the wheel axis. This exemplary embodiment or another exemplary embodiment may further provide. This exemplary embodiment or another exemplary embodiment may further provide wherein the transverse axis of the driveshaft is above wheel axis the forwardly displaced relative to the wheel axis at an angle in a range from about 10 degrees to about 50 degrees. This exemplary embodiment or another exemplary embodiment may further provide wherein the range of the angle is from about 20 degrees to about 40 degrees. This exemplary embodiment or another exemplary embodiment may further provide wherein the angle is about 30 degrees.

This exemplary embodiment or another exemplary embodiment may further provide a hitch with a flared opening adapted to permit an implement being towed by the walk-behind tractor to pivot within a bounded range of motion. This exemplary embodiment or another exemplary embodiment may further provide a set screw on the hitch that extends into the flared opening adapted to decrease the bounded range of motion for the implement to pivot.

In yet another aspect, an exemplary embodiment of the present disclosure may provide a walk-behind tractor having an increased ground clearance comprising: a wheel axis about which at least two ground engaging wheels rotate during operation of the walk-behind tractor, wherein the wheel axis is disposed at a first height above ground; a ground clearance second height measured between the at least two ground engaging wheels from ground to one of (i) a lower surface of a frame and (ii) a lower surface of a drive assembly; wherein the ground clearance second height is in a range from 10% to 100% greater than the first height adapted to permit taller plants to pass below the walk-behind tractor during operation thereof than would be permitted if the ground clearance second height equaled the first height.

In accordance with another aspect, an exemplary embodiment may provide a walk-behind tractor has an increased ground clearance to define a plant receiving space that has a greater height than a conventional walk-behind tractor having a straight axle. The walk-behind tractor has trailing drop arms from a frame that carry wheel axles that result in an elevated height of a driveshaft. The elevated driveshaft increases the ground clearance for taller plants to pass therebeneath during operation of the walk-behind tractor which would otherwise be too tall to pass below a conventional straight axle walk-behind tractor.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

A walk-behind tractor shown throughout the figures in accordance with exemplary embodiments of the present disclosure is shown generally at 10. The walk-behind tractor 10 may also be referred to as a walking tractor or a two-wheel tractor. Walk-behind tractor 10 has an increased ground clearance relative to plants passing below portions of the tractor 10 and between ground engaging wheels during operation of the walk-behind tractor 10. Portions of the drive assembly, such as a driveshaft, are located above an axis defined by one or more axles for the wheels at a greater height relative to the ground to establish the necessary ground clearance for plants to pass below the walk-behind tractor during operation thereof.

Figure 1:
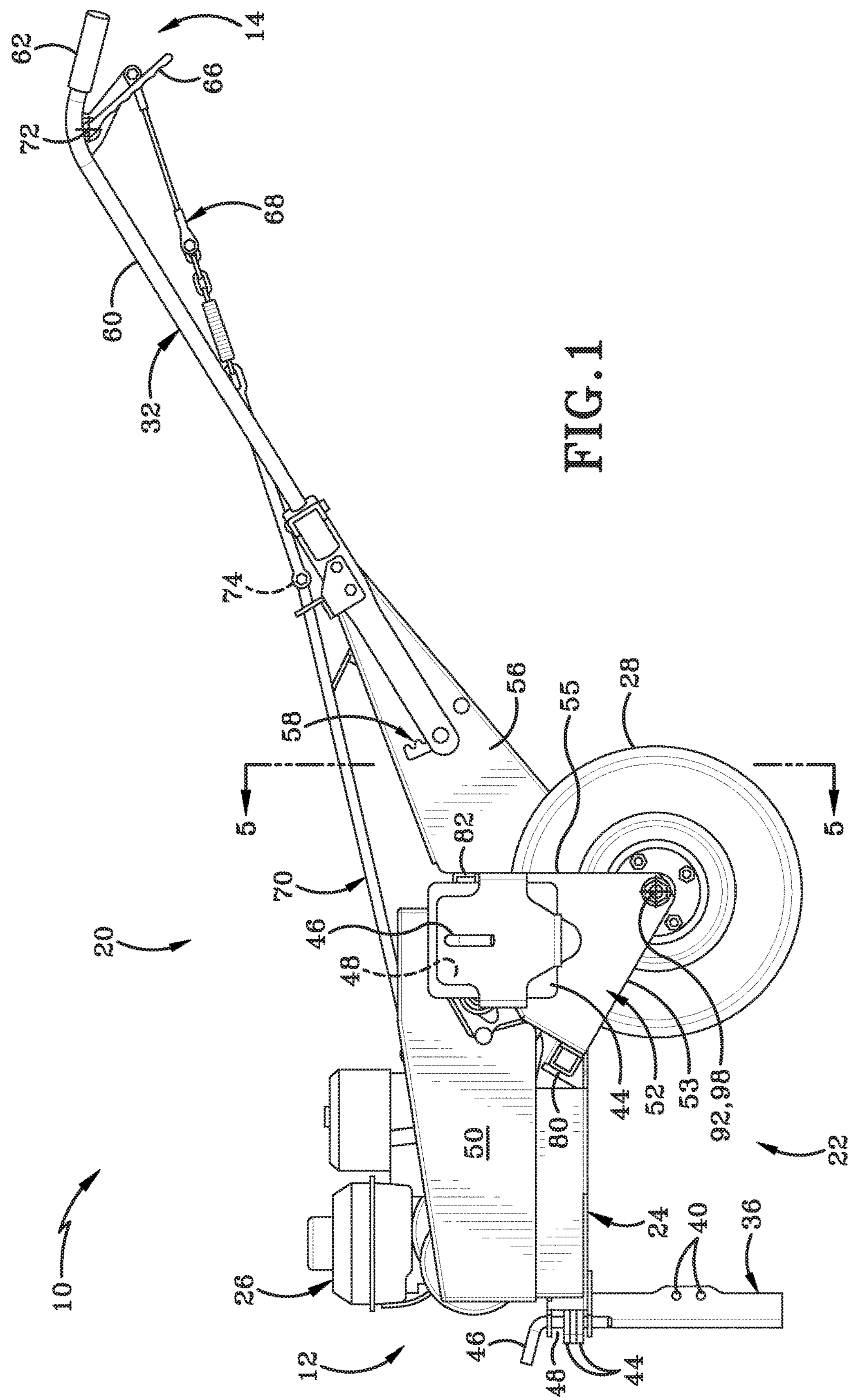
FIG. 1 (FIG. 1) is a first side elevation view of one embodiment of a walk-behind tractor of the present disclosure.
Figure 2:
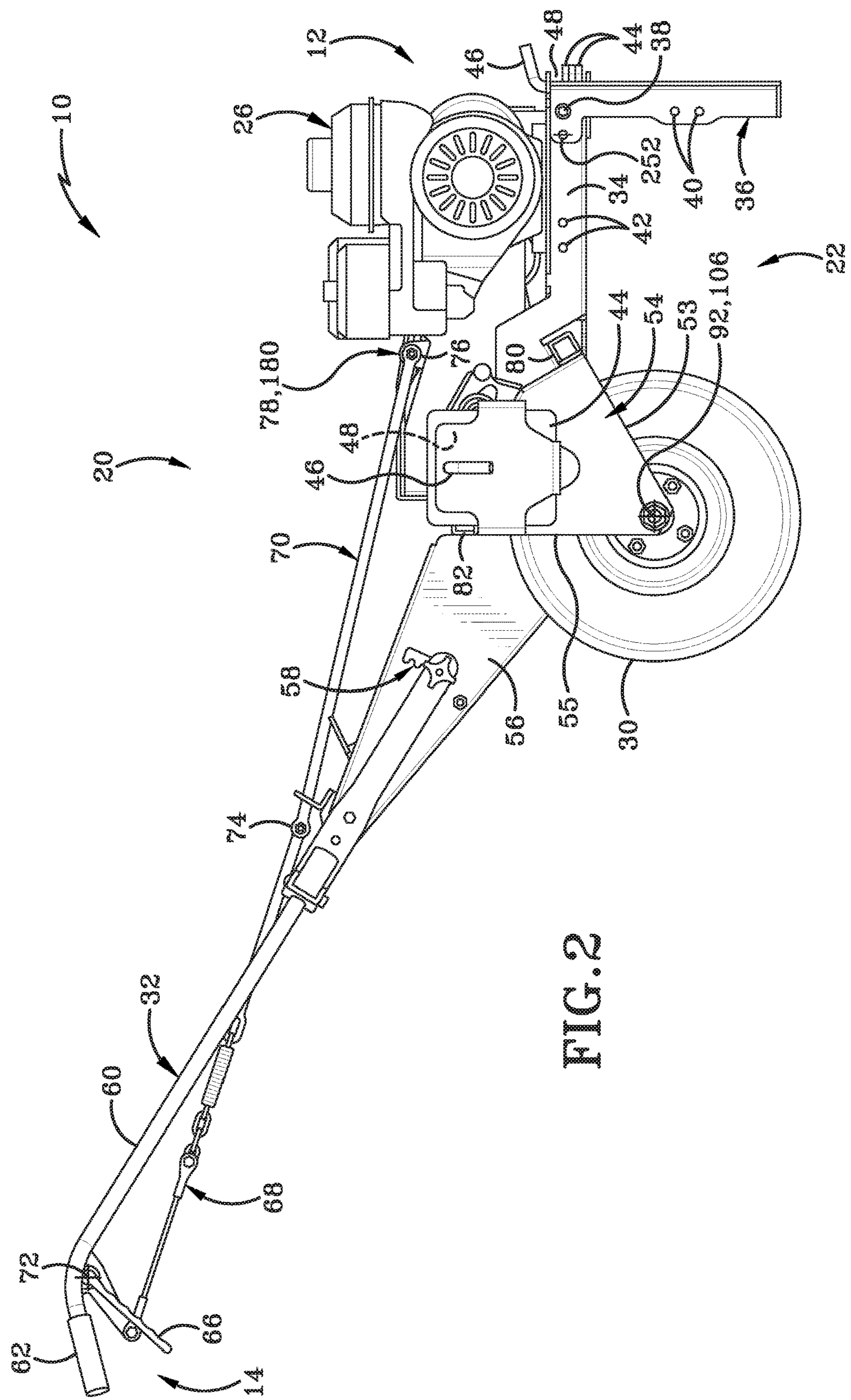
FIG. 2 (FIG. 2) is a second side elevation view of the walk-behind tractor of the present disclosure shown in FIG. 1.

FIG. 1 and FIG. 2 depict the walk-behind tractor 10 as having a front end 12 opposite a rear end 14 defining a longitudinal direction therebetween. Walk-behind tractor 10 has a first side 16 opposite a second side 18 defining a transverse direction therebetween. Tractor 10 further includes an upper end or top 20 opposite a lower end or bottom 22 defining a vertical direction therebetween.

With continued reference to FIG. 1 and FIG. 2, walk-behind tractor 10 includes a frame 24 supporting an engine 26, a first ground engaging wheel 28, a second ground engaging wheel 30, and a rearward extending handle assembly 32.

Engine 26 supported by frame 24 may be a conventional two-stroke or four-stroke engine configured to be powered by gasoline or another combustible fuel. Engine 26 may have various air intake components as well as other sub-components that are common to conventional two-stroke engines or four-stroke engines. Engine 26 may have a lower surface that is mounted to an upperwardly facing surface of frame 24. In one particular embodiment, engine 26 has a crankshaft that acts as a power take-off (PTO) which may be utilized by other components of a drive system within walk-behind tractor 10 and as will be described in greater detail herein. Engine 26 may be offset towards front end 12 of walk-behind tractor 10. In one particular embodiment, engine 26 is located forwardly from the first ground engaging wheel 28 and the second ground engaging wheel 30. In another particular embodiment, the crankshaft for the power take off of engine 26 is located forwardly and above the first and second ground engaging wheels 28, 30. Stated otherwise and more particularly, the power take off (PTO) of the crankshaft for the engine 26 may be entirely above an uppermost surface of the first and second ground engaging wheels 28, 30.

Frame 24 may include a first longitudinal arm 34 that extends rearwardly from a forward end to a rearmost end. First longitudinal arm 34 may be one of two longitudinal arms that extend generally in parallel in the longitudinal direction. Arm 34 may be positioned forwardly from a majority of the first and second ground engaging wheels 28, 30 and forwardly from the handle assembly 32. Arm 34 may be position vertically below a majority of engine 26. A kickstand 36 may be connected to the longitudinal arm via a pivot relationship about a connector 38. Kickstand 36 may include a plurality of through-holes 40 which correspond to complimentary through-holes 42 in the longitudinal member 34. As will be described in greater detail, the kickstand may be moved from a grounded position (as shown in FIG. 1 and FIG. 2) to a raised position where a pin may be inserted through aligned through apertures 40, 42 when walk-behind tractor is in operation.

The frame 24 may define a plurality of weight receiving areas that are configured to receive and support supplemental weights 44. In one particular embodiment, a first weight receiving area is located at forward end of the walk-behind tractor and the weights 44 are configured to be vertically stacked and aligned and secured with a pin 46. In other embodiments, and as shown in FIG. 1 and FIG. 2, the walk-behind tractor may have weight receiving slots 48 which are configured to receive vertically aligned weights 44 therein. While the weight slots 48 are shown as connected to a drop arm assembly, it is entirely possible that the weight receiving slots be directly connected to the frame 24. The weights 44 are utilized to add mass to the walk-behind tractor 10 to increase traction thereof during operation when moving the walk-behind tractor with increased ground clearance over plants that would ordinarily be too tall to pass below a conventional walk-behind tractor.

FIG. 1 further depicts that the walk-behind tractor 10 may include a shroud or cover 50 that covers a portion of the drive assembly of walk-behind tractor 10. Cover 50 is configured to protect the components internal to the drive assembly 200 (FIG. 7), which will be shown in greater detail herein as if the cover 50 were removed. Namely, components of the drive assembly 200 such as the crankshaft PTO, drive pulleys, tension pulleys, and the driveshaft are located behind the cover 50 which acts as a shroud to protect the drive assembly components during operation of the walk-behind tractor.

With continued reference to FIG. 1, a first drop arm assembly 52 is connected directly, or at least indirectly, to the frame 24 at one side thereof. In one particular embodiment, the first drop arm assembly 52 is on the first side of the frame 24. A second drop arm assembly 54 (FIG. 2) is connected to the frame 24 at the second side thereof. First and second drop arm assemblies 52, 54 are connected to a rear end of the frame 24 so as to extend downwardly and rearward therefrom. However, other embodiments may provide for the drop arm assembly to extend directly downward. Drop arm assemblies 52, 54 extend below the frame which positions them below and rearward of the engine 26. Additionally, the drop arm assemblies are generally below the handle assembly 32. First drop arm assembly 52 is operatively connected with the first ground engaging wheel 28 and the second drop arm assembly 54 is operatively connected with the second ground engaging wheel 30. As will be described in greater detail below, a stub axle extends through each respective wheel 28, 30 to connect with each respective drop arm assembly 52, 54.

Figure 3:
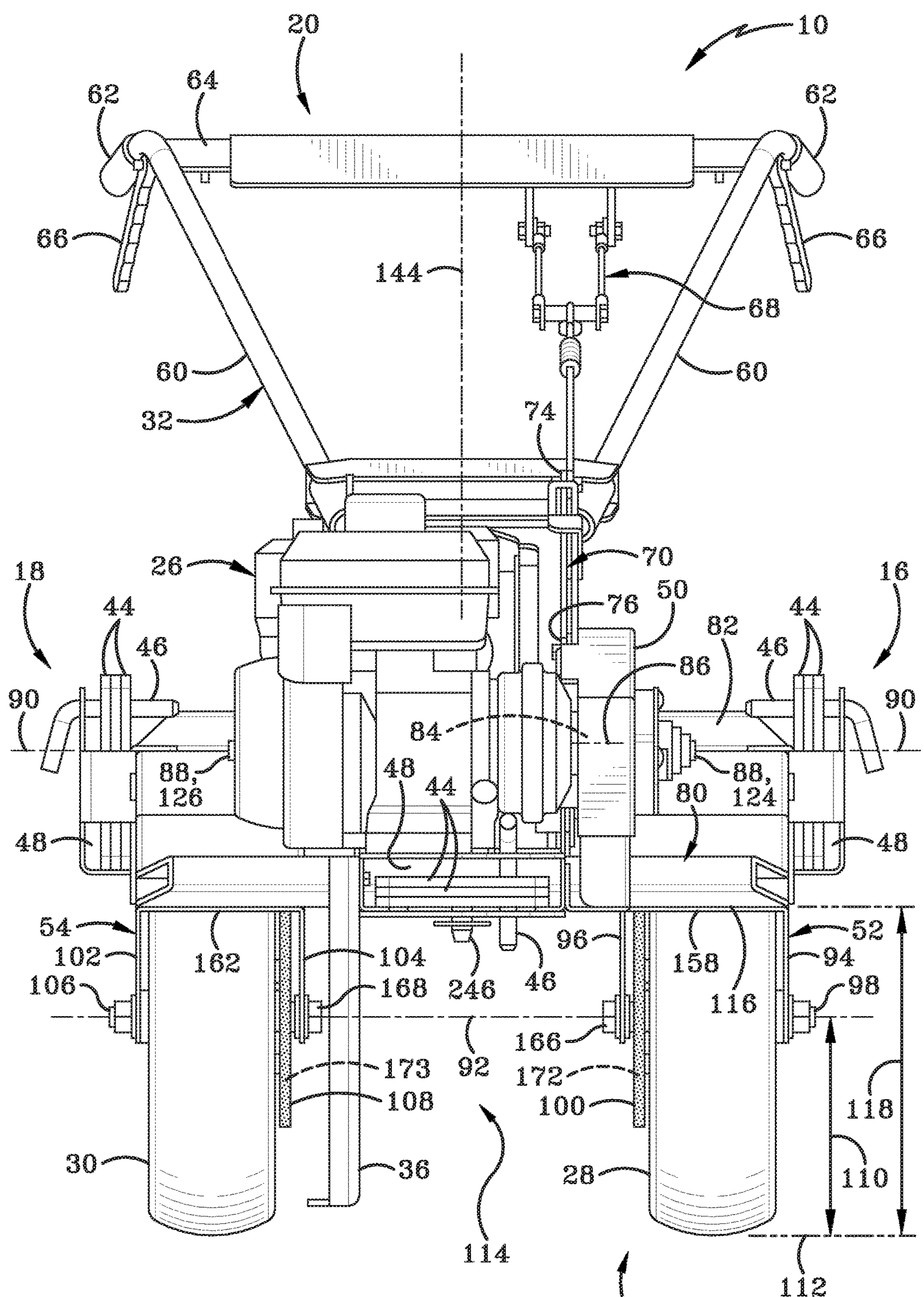
FIG. 3 (FIG. 3) is front elevation view of the walk-behind tractor of the present disclosure shown in FIG. 1.

The handle assembly 32 is coupled with the frame 24 and extends rearward from the frame 24. Handle assembly extends rearward and upward relative to drop arm assemblies 52, 54. Additionally, the handle assembly 32 may be upwardly extended in a longitudinal direction from the rear end of the frame 24 and the ground engaging wheels 28, 30 to enable an operator to walk behind the walk-behind tractor 10 in an upright position. More particularly, handle assembly 32 includes at least one extension member 56 connected, at least indirectly to frame 24, and the member 56 which may include a transverse cut out defining detents 58. Notably, the extension member 56 may be formed form two planar panels on each respective side of the walk-behind tractor 10. However, any structure configuration to effectuate the rearward extension of the handle assembly 32 and height adjustment thereof are entirely possible. Namely, detents 58, or other configuration to effectuate adjustment, are used to adjust an operatively connected second extension member 60. The extension member 60 may be formed from two arms that flare upwardly and outwardly (as shown in FIG. 3) to terminate at respective handles 62 with a cross bar 64 extending therebetween. Handles 62 may include one or more triggers 66 which are operatively connected with mechanical linkage 68, which extends longitudinally through the two arms defining second extension member 60 towards the engine 26 so as to be operatively connected to the drive assembly shrouded by cover 50, and described in greater detail below. More particularly, linkage 68 includes a link arm 70 located above the first extension member 56 that is adapted to be pulled in response to trigger 66 movement about a trigger axis 72 during operation of the walk-behind tractor 10. Actuation of one or both of the triggers 66 by an operator grasping handle 62 may effectuate operational movement of the walk-behind tractor 10 by engaging the drive system 200 with the ground engaging wheels 28, 30. Additionally, the extensions 60 may be pivotably adjustable with respect to the cutout with detents 58 by pivoting the extension 60 about a pivot axis and locking the extension 60 at a different angular orientation relative to the extension member 56 to make the walk-behind tractor height adjustable for different users.

As depicted in FIG. 2, link arm 70 in an elongated member or rod that includes a first end 74 and a second end 76. First end 74 is connected with a rearward portion of the linkage 68 and the second end 76 is connected with a support flange 78 of the drive assembly 200 that is configured to pivot as will be described in greater detail herein. The first end 74 of the link arm may be positioned rearward of the ground engaging wheels 28, 30 while the second end 76 is positioned forward of the ground engaging wheels. Second end 76 is positioned forward of the first and second drop arm assemblies 52, 54

With continued reference to FIG. 2, each drop arm assembly 52, 54 includes a leading edge 53 and a trailing edge 55. Leading edge 53 is angled forwardly and downwardly relative to ground 112. In one particular embodiment, leading edge 53 is oriented at an angle and arranged from about 10 degrees to about 40 degrees relative to a horizontal plane 57 intersecting a wheel axis 92 (FIG. 3). The trailing edge 55 of each respective drop arm assembly 52, 54 may be a generally vertical edge extending from an upper end connected with the frame 24 to a lower terminal end that receives the stub axle therethrough. Thus, when viewed from the side, the drop arm assembly 52, 54 may generally resemble the shape of a triangle, wherein the apex of the triangular shape of the drop arm assembly 52, 54 is oriented downwardly and receives the stub axles therethrough to define wheel axis 92 (FIG. 3).

FIG. 3 depicts that the frame 24 may include a first or forward cross member 80 and a second or rear cross member 82. The cross members 80, 82 extend transversely to define a width of the frame 24 extending between the first side 16 and the second side 18. In some embodiments, the ends of the cross members 80, 82 are formed from an elongated rigid member. The cross members may be formed from rigid square tubing and taper downwardly at an angle at each respective end associated with each side of the frame. The length of the cross members 80,82 are aligned in the transverse direction and are sized based on the operational needs for the transverse width of the walk-behind tractor. Thus, if the wheelbase between the two ground engaging wheels 28, 30 needs to be increased, then the transversely aligned length of the cross members 80, 82 will be increased. The cross members 80, 82 of frame 24 assist with supporting the engine 26 such that the components of engine 26 are positioned above the cross members 80, 82.

With continued reference to FIG. 3, engine 26 includes the crankshaft PTO 84 which rotates around a crankshaft axis 86. Crankshaft axis 86 is located above the first cross member 80. Crankshaft PTO 84 may be generally transversely aligned such that the crankshaft PTO 84 is oriented as facing the first side 16 of the walk-behind tractor 10. Crankshaft PTO 84 is positioned forwardly from ground engaging wheels 28, 30 and wheel axis 92, and above the drop arm assemblies 52, 54. Being coupled to engine 26, the crankshaft PTO 84 is supported above frame 24. As will be described in greater detail herein, crankshaft PTO 84 is connected with the drive assembly 200, which includes components that are covered by cover 50. Portions of the drive assembly are connected with a driveshaft 88 (FIG. 4) which defines a driveshaft axis 90. The driveshaft axis 90 is located above a wheel axis 92 about which the first and second ground engaging wheels 28, 30 rotate during operation of the walk-behind tractor 10.

With continued reference to FIG. 3, the wheel axis 92, positioned below the driveshaft axis 90, is defined by respective stub axles extending through the ground engaging wheels on the drop arm assemblies 52, 54. More particularly, first drop arm assembly 52 includes an outer flange 94 and an inner flange 96. A first stub axle 98 is transversely centered along the wheel axis 92. Stub axle 98 extends transversely along the wheel axis 92 between the outer flange 94 and the inner flange 96. Inner flange 96 is located closer or proximal to a longitudinal centerline 144 of the walk-behind tractor 10. First ground engaging wheel 28 is supported by the first stub axle 98 between the outer flange 94 and the inner flange 96. A looped member 100, which may be a belt or a chain, is positioned between the ground engaging wheel 28 and the inner flange 96 of the first drop arm assembly 52. Thus, looped mechanism or member 100 is proximal to the longitudinal centerline relative to the wheel 28. As will be described in greater detail herein, the looped member 100 is connected to a sprocket assembly carried by the first ground engaging wheel 28 and a corresponding sprocket or gear operatively connected to the driveshaft 88. Sprocket 172 (FIG. 6) or sprocket assembly on wheel 28 is proximal to the longitudinal centerline 144 relative to wheel 28. Similarly, the second drop arm assembly 54 includes an outer flange 102 and an inner flange 104. A second stub axle 106 extends between the outer flange 102 and the inner flange 104. The second ground engaging wheel 30 is rotatably supported by the second stub axle 106. A second looped mechanism or member 108, which may be a chain or a belt, is operatively connected to a sprocket carried by the second ground engaging wheel 30 and is operatively connected to a corresponding sprocket on the driveshaft 88.

The first and second stub axles 98, 106 are coaxially aligned along the wheel axis 92, which is positioned at a first height 110 above ground 112. Additionally, as will be described in greater detail below, a plant receiving space 114 may be defined between the inner flanges 96, 104 of the respective drop arm assemblies 52, 54. Further, plant receiving space or region 114 is bound by the lower surface of the frame 24. More particularly, cross member 80 may have a lower surface 116 that bounds the upper limit of the plant receiving space 114. Thus, a vertical height of the plant receiving space 114, which may be shown as 118, may be measured from ground 112 to lower surface 116 to define the vertical height of the plant receiving space 114. Notably, FIG. 3 depicts kickstand 36 as in a grounded position; however, during operation the kickstand 36 will be pivoted about axis 38 upwardly and out of the way so as to not interfere or interrupt or limit the size of plant receiving space 114.

Figure 4:
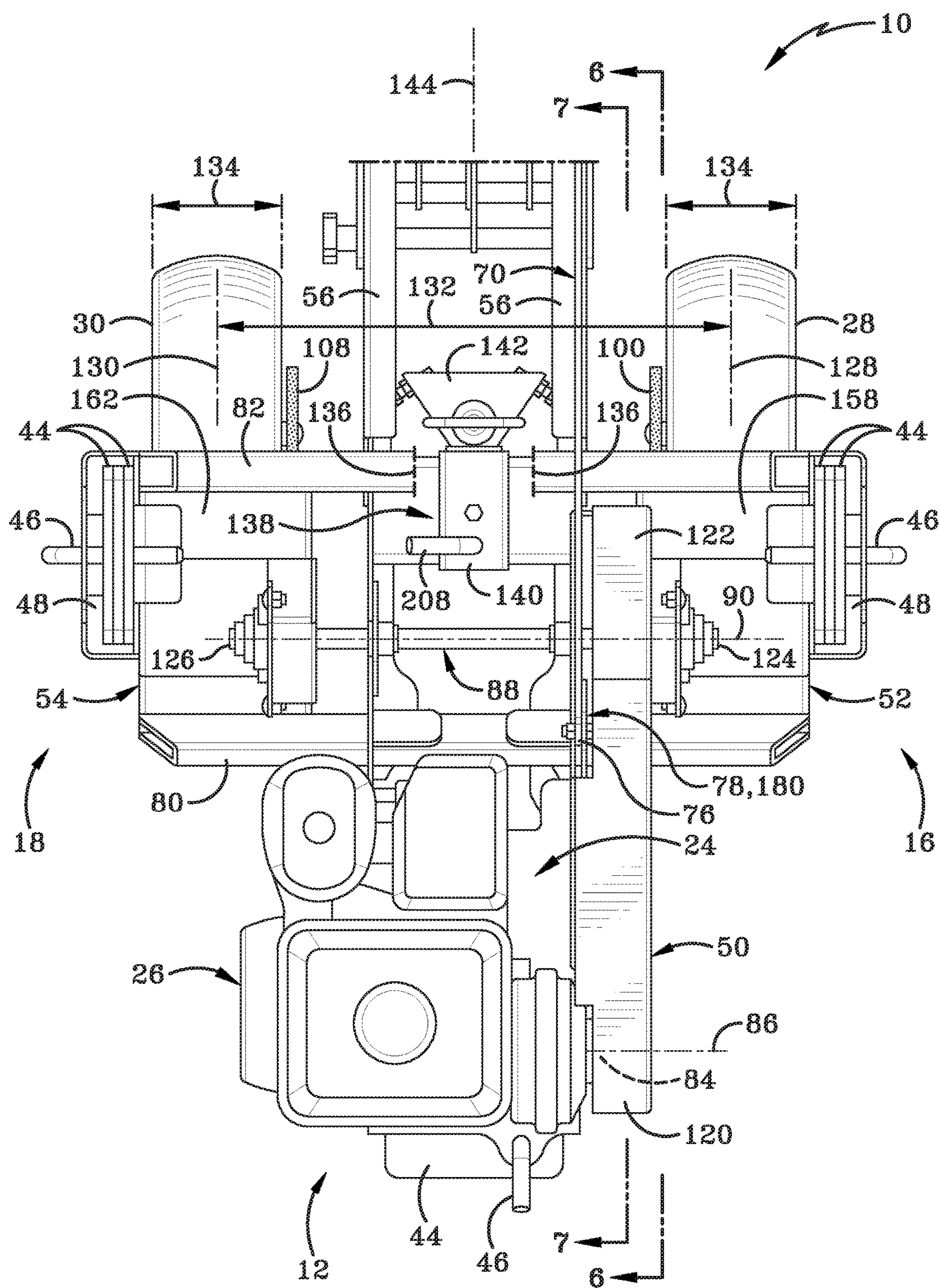
FIG. 4 (FIG. 4) is a partial top plan view of the walk-behind tractor of the present disclosure shown in FIG. 1.

FIG. 4 depicts cover 50 as being offset towards the first side 16 from the engine 26. Engine 26 and its crankshaft PTO 84 define a crankshaft axis 86 are oriented towards a forward end of the cover 50. Crankshaft PTO 84 is positioned forward from driveshaft 88 and driveshaft axis 90. Cover 50 includes the forward end 120 and extends rearwardly to a rear end 122. The forward end 120 of cover 50 is proximate the crankshaft axis 86 and the rearend 122 of cover 50 is proximate the crankshaft axis 90. Flange 78 is connected with the second end 76 of link arm 70 and is offset towards the second side 18 from the cover 50 between the first end 120 and the second end 122. The operational components of the drive assembly covered by cover 50 will be described in greater detail herein.

With continued reference to FIG. 4, the driveshaft 88 that defines the drive axis 90 is positioned longitudinally between the first cross member 80 and the second cross member 82. The length of the driveshaft 88 extends transversely between a first end 124 and a second end 126. The first end 124 of driveshaft 88 terminates around a tire longitudinal center line 128 associated with the first ground engaging wheel 28. The second end 126 of driveshaft 88 terminates generally coplanar with a tire longitudinal center line 130 associated with the second ground engaging wheel 30. Driveshaft may be a generally cylindrical rigid rod extending between the first and second ends 124, 126. Driveshaft 88 may be supported via mounting brackets and bearings operatively coupled to frame 24 that enable the driveshaft 88 to rotate about the drive axis 90. Drive axis 90 is located between first and second cross members 80, 82. In one particular embodiment, drive axis 90 is positioned rearward from the engine 26 and its crankshaft axis 86. Drive axis is position forward from the second cross member 82. The brackets that support the driveshaft 88 connected to the frame 24 may extend upwardly from a lower portion of the frame 24 to position the drive axis 90 vertically above first cross member 80. In one particular embodiment, drive axis 90 is located vertically below the second cross member 82; however, it is entirely possible that other vertical orientations of the drive axis 90 relative to the cross member 82 are entirely possible. In one particular embodiment, the driveshaft 88 perpendicularly intersects the longitudinal centerline 144.

With continued reference to FIG. 4, the wheelbase of walk-behind tractor 10 may be defined by distance between longitudinal center line 128 associated with the first ground engaging wheel 28 and the longitudinal center line 130 associated with the second ground engaging wheel 30. The transverse wheelbase 132 may be any wheelbase width depending on the operational needs of the walk-behind tractor. For example, the overall width of the walk-behind tractor 10 may be increased if the width of the plants passing below the walk-behind tractor through the plant receiving space or region 115 are wider. However, if narrower crops are being tended to, then it would be possible to construct a walk-behind tractor having a narrower wheelbase 132. Furthermore, the respective width 134 of each tire 28, 30 may be selectively chosen depending on the desired operation of the walk-behind tractor. When the walk-behind tractor is utilized in softer terrains, a wider width 134 with inflatable tires of the ground engaging wheels 28, 30 may be desirable. However, as is shown in later embodiments (see FIG. 4A), a narrower width of the tires, which may be inflatable or non-inflatable, may be utilized which could be beneficial when the ground 112 is more firm.

Figure 4A:
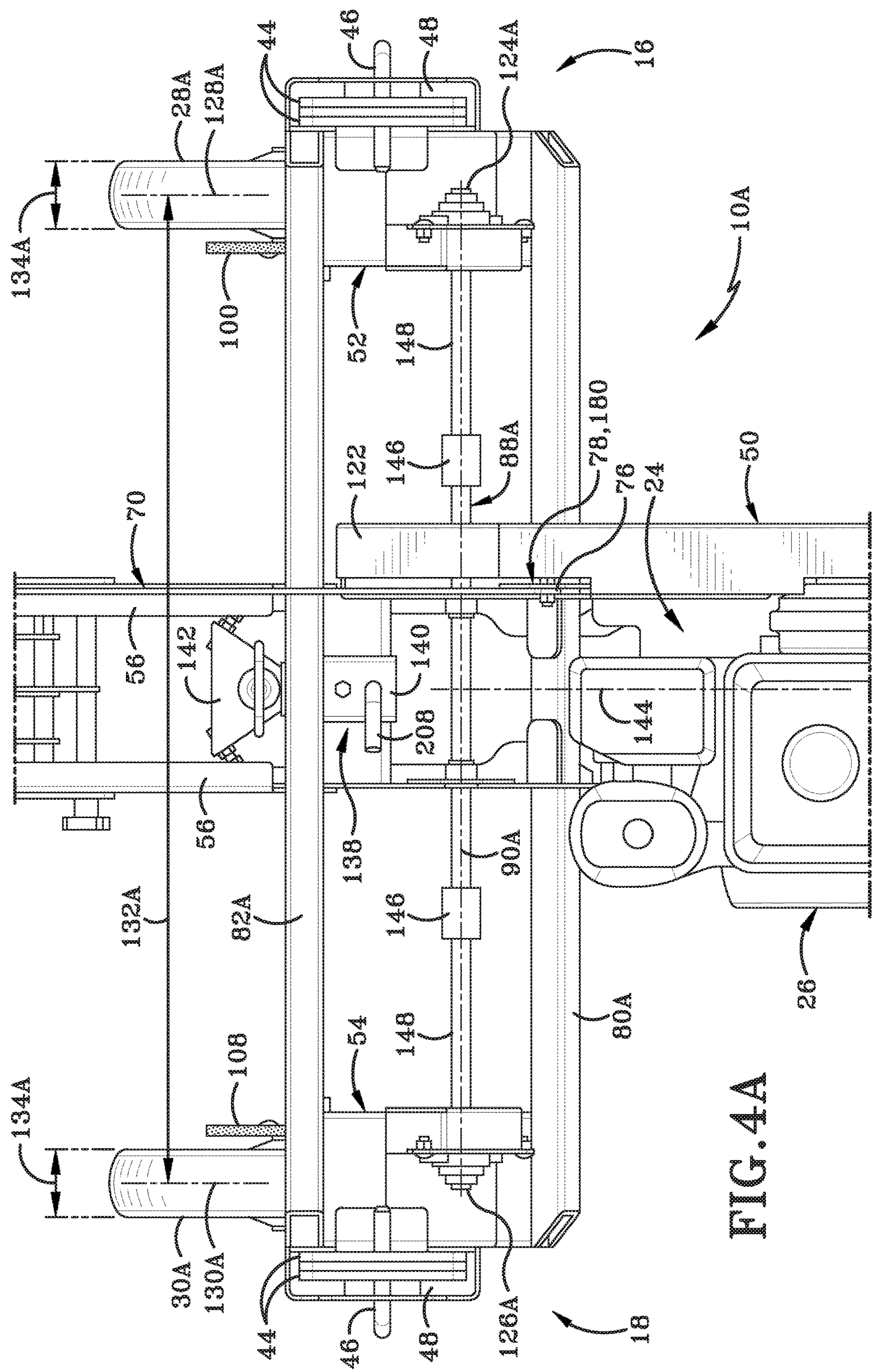
FIG. 4A (FIG. 4A) is a partial top plan view of another embodiment of a walk-behind tractor having a wider wheelbase than the embodiment shown in FIG. 4.

With continued reference to FIG. 4, the second cross member 82 is shown with a break away line 136 to reveal a hitch assembly 138 positioned below the cross member 82 on frame 24. Hitch assembly 138 includes a receiver 140 and a supplemental insertion flared hitch 142. Receiver 140 is rigidly connected with the frame and is rearwardly opened to receive an insert extension member of the flared hitch 142 therein. In one particular embodiment, the rearwardly opened receiver is centered along the longitudinal center line 144 of the walk-behind tractor 10. As will be described in greater detail herein, the supplemental flared hitch 142 includes a rearward opened receiving space that tapers inwardly towards longitudinal center line 144 as the sidewalls of the flared hitch extend forwardly towards the front end 12 along the longitudinal center line 144. While the hitch receiver 140 is shown as positioned rearward from the driveshaft 88, other positions are entirely possible. For example, receiver 140 may be connected along the longitudinal center line near the front end 12 of the walk-behind tractor to enable an implement to be connected thereto. When the receiver 140 of the hitch assembly 138 is positioned rearward of the driveshaft, the walk-behind tractor 10 is configured to tow or pull an implement therebehind. Hitch assembly 138 is positioned above the wheel axis 92 and below the driveshaft axis 96A FIG. 4A depicts an alternative embodiment of the walk-behind tractor generally at 10A. Walk-behind tractor 10A includes similar components to walk-behind tractor 10 except for it has a wider wheelbase 132A. To accomplish the wider wheelbase 132A, the cross members 80A, 82A have a greater transversely aligned length measured from the first side 16 to the second side 18. This embodiment further shows a narrower set of wheels having tires, which may be inflatable or non-inflatable, having a narrower wheel width 134A. Particularly, a first narrow wheel 28A and a second narrow wheel 30A have narrower wheel widths 134A than those in the previous embodiment (as measured between wheel centerlines 128A, 130A, respectively). When implementing the walk-behind tractor 10A with a wider wheelbase 132A, a modified driveshaft 88A may be utilized to extend the transversely aligned length thereof between its first end 124A and a second end 126A. To extend the length of the driveshaft in the transverse direction, one or more couplers 146 can be utilized to add extension portions 148 along the driveshaft axis 90A. The extension portions 148 may be connected with the sprocket and gear assemblies that respectively couple the first and second wheels 28A, 30A via looped mechanisms or members 100, 108, respectively, to the driveshaft 88A. In this configuration, the driveshaft 88A and its extensions 148 coupled via couplers 146 are disposed longitudinally between the first cross member 80A and the second cross member 82A. However, other embodiments may provide driveshaft 88A as a unibody construction free form couplers 146

Figure 5:
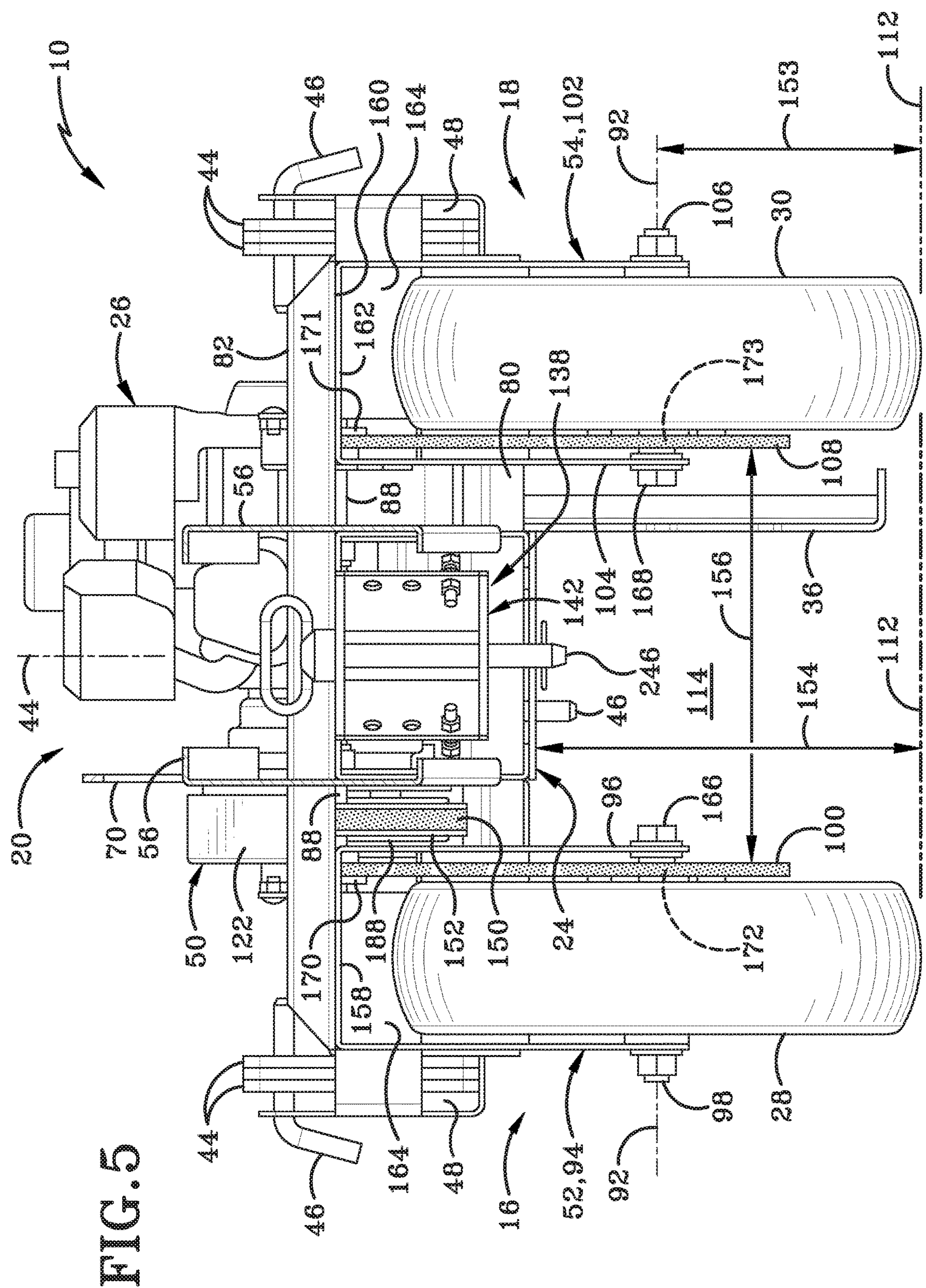
FIG. 5 (FIG. 5) is a transverse cross section view of the walk-behind tractor taken along line 5-5 in FIG. 1.

FIG. 5 is a cross section view taken along line 5-5 in FIG. 1. The forward facing cross section of FIG. 5 depicts a drive belt 150 that is connected to driveshaft 88 via a pulley 152. The pulley 152 is coaxial with and rotatable about the driveshaft axis 90. Pulley 152 may be rigidly connected to driveshaft 88 and is configured to rotate therewith. The looped mechanism or member 100 extends upwardly from a gear or sprocket 172 (FIG. 6) carried by the first ground engaging wheel 28 and extends upwardly to a corresponding gear or sprocket 170 (FIG. 6) rigidly connected with the driveshaft 88. Additionally, the loop mechanism or member 108 operatively coupled to the second ground engaging wheel 30 extends upwardly to another respective sprocket coupled with the driveshaft 88 that is rigidly connected thereto to rotate the wheels during operation of the walk-behind tractor 10. Pulley 152 may be located to proximal (i.e., closer to) the longitudinal centerline 144 relative to the sprockets on the driveshaft 88 that respectively couple the looped members 100, 108 to the wheels 28, 30.

The drop arm assemblies 52, 54 are shown as disposing the wheels and wheel axis 92 below the drive belt 150 and its corresponding drive pulley 152. By elevating the driveshaft 88 above the wheel axis 92, the plant receiving space 114 has an increased height 154 to allow plants to pass there beneath. The width of the plant receiving space may be measured from a few different locations. In one particular example, the width of the plant receiving space or region 114 is measured between the respective inner surfaces of the loop mechanisms 100, 108. In this instance, the width 156 is measured between the respective inner surfaces of the looped mechanisms 100, 108 and is less than the height 154. Alternatively, the width 156 of the plant receiving region or space 114 may be measured from other locations between the first and second ground engaging wheels 28, 30. For example, the width 156 may be measured between major surfaces of the respective inner flanges 96, 104 on the first and second drop arm assemblies 52, 54. The height 154 may be measured from the ground 112 to the lower surface of the frame. In one particular embodiment, the lower surface of the frame is defined by lower surface 116 of first cross member 80. However, the height 154 may be measured from the ground 112 to other lower portions of the frame 24.

With continued reference to FIG. 5, the first drop arm assembly 52 may include a transverse upper flange 158 that is rigidly secured to the lower surface 160 of second cross member 82. Accordingly, the transverse upper flange 158 of first drop arm assembly 52 may be positioned vertically above the first cross member 80 on frame 24. Further, upper transverse flange 158 of the drop arm assembly 52 may be positioned vertically above the driveshaft 88 and the drive axis 90. Similarly, the second drop arm assembly 54 includes an upper transverse flange 162 extending between its outer flange 102 and its inner flange 104 and is rigidly connected to the lower surface 160 of the second cross member 82. Each drop arm assembly 52, 54 defines a slot-shaped space 164 between its respective inner and outer flanges and its upper flange rigidly connected to the lower surface 160 of the second cross member 82. The slot-shaped space 164 is sized to receive the wheel/tire, either first ground engaging wheel 28 on the first drop arm assembly 52 or the second ground engaging wheel 30 on the second drop arm assembly 54 therein. Further, the respective looped mechanisms, looped member 100 or looped member 108 therein.

As depicted in FIG. 5, the drive belt 150 is positioned vertically above the plant receiving space 114; however, is within the width 156 thereof. Stated otherwise, the drive belt 150 is above but interior (relative to the profile of the width) the respective inner flanges 96, 94 on the first and second drop arm assemblies 52, 54 relative to a longitudinal center line 144 of the walk-behind tractor 10. Notably, the drive belt 150 is not within the plan receiving space 114 but above it between the longitudinal centerlines 128, 130 of the wheels.

With continued reference to FIG. 5, the first stub axle 98 may include an interior proximal end 166 that is the closest portion of the first stub axle 98 relative to the longitudinal center line. The second stub axle 106 may include an interior proximal end 168 that is the closest portion of the second stub axle relative to the longitudinal center line. The interior width 156 of the plant receiving space or region 114 may be defined and bound by a distance measured between the respective inner proximal ends 166, 168 on the first stub axle 98 and the second stub axle 106. The proximal end 166 of the first stub axle 98 is below the lower surface of the frame 24. Additionally, the proximal end 166 of the stub axle 98 is below the lower surface of, and the entirety of, the driveshaft 88. Similarly, the proximal end 168 of the second stub axle 166 is below the lower surface of the frame 24 and below the lower surface of the driveshaft 88. When using the proximal ends 166, 168 as a reference point for defining the plant receiving region or space 114, the plant receiving area, region, or space 114 may be defined by the proximal ends 166, 168 of the first and second stub axles 98, 106, respectively and a lower portion of either the frame or driveshaft. As indicated previously, the height 154, which is also referred to as the ground clearance height 154, of the plant receiving space 114 is typically greater than its width 156. However, in other embodiments, such as that which is shown in FIG. 4A (walk-behind tractor 10A), the width 156 of the plant receiving space 114 may be greater than its height 154.

The wheel axis 92 is disposed at a height 153 above ground 112. Similar to conventional walk-behind tractors, the height 153 of the wheel axis is in a range from about 6 inches to about 12 inches depending on the size of the tires of wheels 28, 30. Walk-behind tractor 10, 10A is distinguishable from the conventional straight axle type of walk-behind tractor due to the increased ground clearance defined by height 154 of by the plant receiving space. In accordance with an exemplary aspect of the present disclosure, the ground clearance height 154 located between the wheels is different and greater than the height 153 of the wheel axis 92. In one particular embodiment, ground clearance height 154 is at least 10% greater than wheel axis height 92. In one particular embodiment, the ground clearance height 154 is at least 35% greater than the wheel axis 92. In another particular embodiment, the ground clearance height is in a range from 50% to 100% greater than the height 153 of the wheel axis. Given these parameters, if the wheel axis height 153 is about 6 inches, then the ground clearance height 154 may be either 7 inches, 8 inches, 9 inches, 10 inches, 11 inches, 12 inches or more. If the wheel axis height 153 is about 7 inches, then the ground clearance height 154 may be either 8 inches, 9 inches, 10 inches, 11 inches, 12 inches, 13 inches, 14 inches or more. If the wheel axis height 153 is about 8 inches, then the ground clearance height 154 may be either 9 inches, 10 inches, 11 inches, 12 inches, 13 inches, 14 inches, 15 inches, 16 inches or more. If the wheel axis height 153 is about 9 inches, then the ground clearance height 154 may be either 10 inches, 11 inches, 12 inches, 13 inches, 14 inches, 15 inches, 16 inches, 17 inches, 18 inches or more. If the wheel axis height 153 is about 10 inches, then the ground clearance height 154 may be either 11 inches, 12 inches, 13 inches, 14 inches, 15 inches, 16 inches, 17 inches, 18 inches, 19 inches, 20 inches or more. If the wheel axis height 153 is about 11 inches, then the ground clearance height 154 may be either 12 inches, 13 inches, 14 inches, 15 inches, 16 inches, 17 inches, 18 inches, 19 inches, 20 inches, 21 inches, 22 inches or more. If the wheel axis height 153 is about 12 inches, then the ground clearance height 154 may be either 13 inches, 14 inches, 15 inches, 16 inches, 17 inches, 18 inches, 19 inches, 20 inches, 21 inches, 22 inches, 23 inches, 24 inches or more. These examples evidence some exemplary advantages of the present disclosure which enable the walk-behind tractor 10,10A to have an increased ground clearance height 154 that enables tractor 10,10A to pass over taller plants that would otherwise not be able to fit below a conventional straight axle walk behind tractor having a ground clearance in a range from about 6 to 12 inches.

Figure 6:
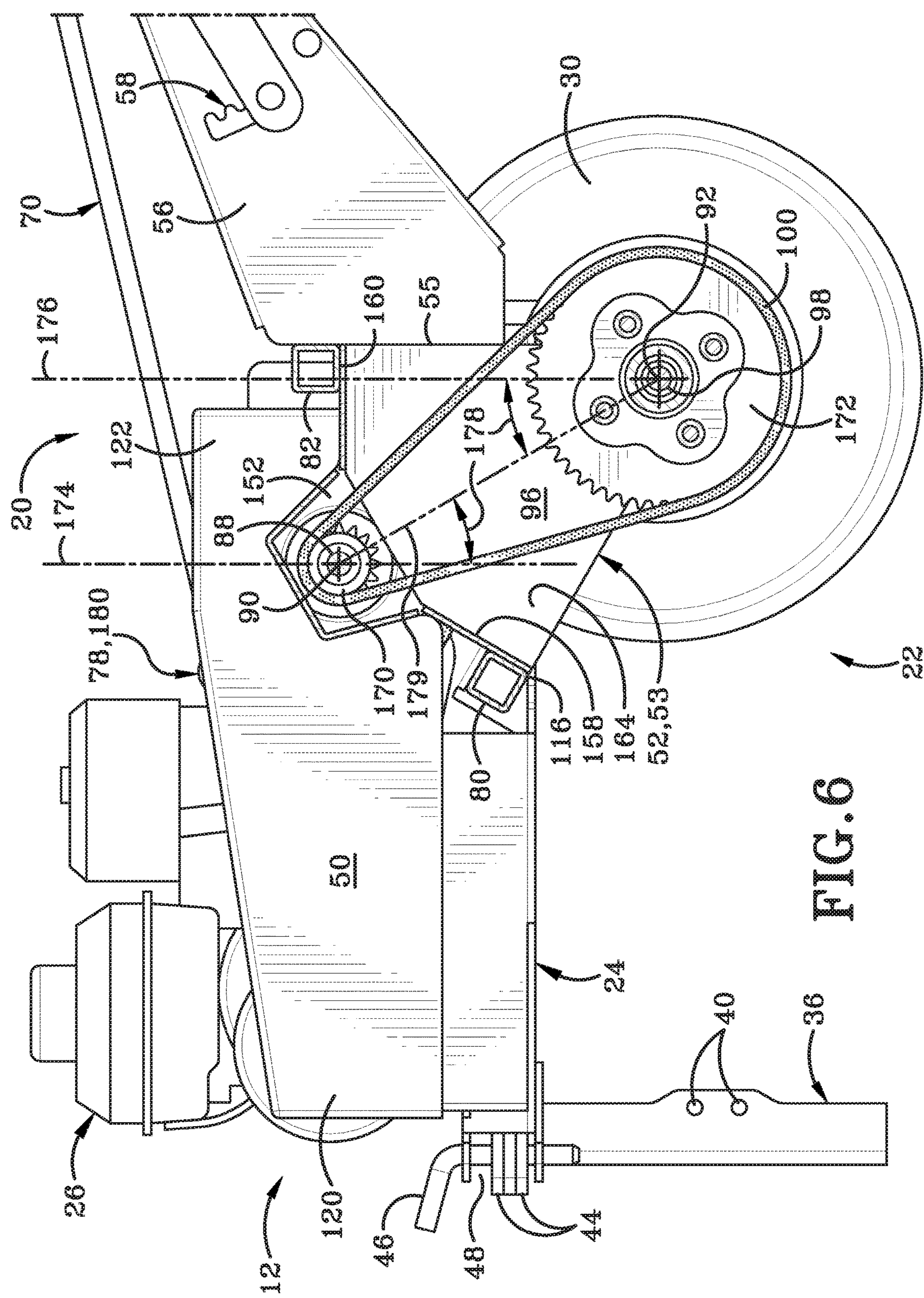
FIG. 6 (FIG. 6) is a longitudinal cross section view of the walk-behind tractor taken along line 6-6 in FIG. 4.

FIG. 6 depicts portions of the drive assembly for the walk-behind tractor 10. Together with FIG. 7, the drive assembly is shown generally at 200. Drive assembly 200 includes the driveshaft 88, which is configured to rotate about the drive axis 90. Sprocket 170 is rigidly coupled with the driveshaft 88. Sprocket 170 includes teeth that engage the looped mechanism or member 100. The looped mechanism or member 100 extends around the sprocket 170 and its teeth and extends downwardly to a corresponding sprocket 172 mounted on the first stub axle 98. Sprocket 172 rotatably supported by stub axle 98 includes teeth, which are configured to engage the loop mechanism 100, which may be a drive belt or a chain to impart rotational force from the driveshaft 88 into the first ground engaging wheel 28. Sprocket 172 is disposed rearward and below sprocket 170.

Sprocket 172 may be fixedly attached to a hub on the ground engaging wheel 28 via various connectors to ensure a rigid connection such that when the sprocket 172 is rotated by the looped mechanism 100, it imparts rotational movement to the wheel connected to stub axle 98 via bearings. Various bearings or other free rotation mechanisms can be utilized to ensure that the hub of the ground engaging wheel 28 freely rotates about the stub axle 98. Sprocket 173 rotatably supported by stub axle 106 includes teeth, which are configured to engage the loop mechanism 108, which may be a drive belt or a chain to impart rotational force from the driveshaft 88 into the second ground engaging wheel 30. Sprocket 173 is disposed rearward and below a corresponding sprocket 171 on driveshaft 88. Sprocket 173 may be fixedly attached to a hub on the ground engaging wheel 30 via various connectors to ensure a rigid connection such that when the sprocket 173 is rotated by the looped mechanism 108, it imparts rotational movement to the wheel connected to stub axle 106 via bearings. Various bearings or other free rotation mechanisms can be utilized to ensure that the hub of the ground engaging wheel 30 freely rotates about the stub axle 106.

With continued reference to FIG. 6, a vertical plane 174 intersects the driveshaft 88. A second vertical plane 176 intersects the stub axle 98. The wheel axis 92 is offset rearward and downwardly from the driveshaft axis 90. When the vertical planes 174, 176 are parallel with each other, the wheel axis 92 is offset downwardly and rearwardly at an angle from the driveshaft axis 90. In one particular embodiment, an angle 178 is defined between an imaginary line 179 extending centrally from the driveshaft axis 90 to the wheel axis 92 and intersecting the two vertical planes 174, 176. The angle 178 may be in a range from about 10 degrees to about 50 degrees. In one particular embodiment, the range of angle 178 is from about 20 degrees to about 40 degrees. In the embodiment shown in FIG. 6, the angle 178 is about 30 degrees. Stated otherwise, the wheel axis 92 is offset about 30 degrees downwardly and rearwardly from the driveshaft 88. Positioning the stub axle 98 along a wheel axis 92 that is rearward and offset below the driveshaft 88 enables the elevation of the driveshaft to provide an increased ground clearance of the walk-behind tractor to allow plants to pass therebeneath.

Figure 7:
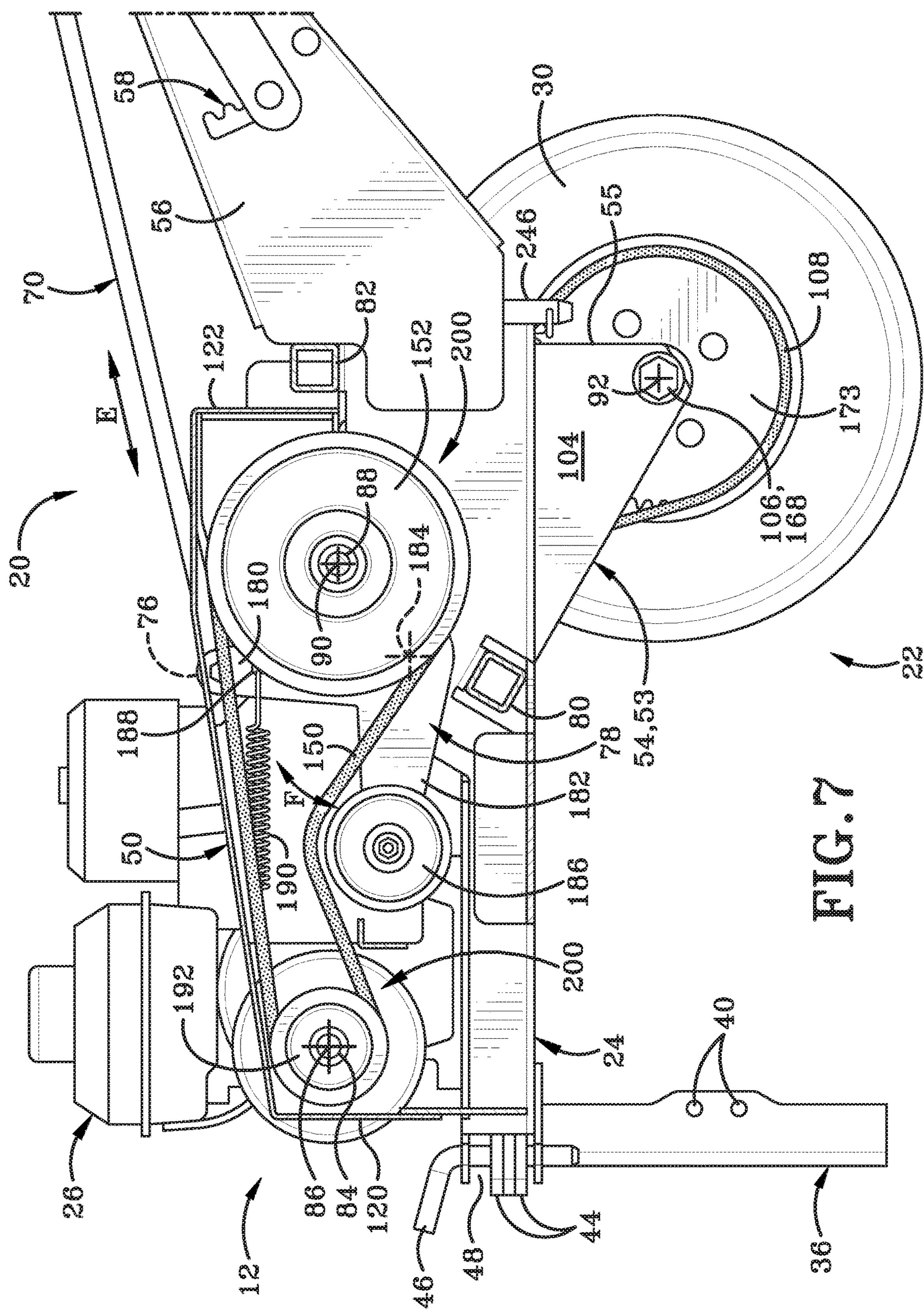
FIG. 7 (FIG. 7) is a longitudinal cross section view of the walk-behind tractor taken along line 7-7 in FIG. 4.

FIG. 7 depicts that the second ground engaging wheel 30 also includes a similar sprocket 178 coupled to the hub of the ground engaging wheel 30 to impart rotational movement of the ground engaging wheel 30 when its looped mechanism 108 is driven by a corresponding sprocket (similar to that of sprocket 170) that is coupled on opposite side of the longitudinal center line 144 to the driveshaft 88.

With continued reference to FIG. 7 and drive assembly 200, the drive assembly 200 includes the drive flange 78, which is generally an L-shaped member comprised of a first arm 180 that is aligned generally vertically and a horizontal second arm 182. Flange 178 is pivotably mounted to a portion of the frame 24 and is configured to pivot about a pivot point 184 defining a transverse axis that is forward and below the drive axis 90. A tensioner pulley 186 is mounted on the horizontal second arm 182 of drive flange 78. The first arm 180 is operatively connected to an extension coil spring 190 that is coupled to the first arm 180 via a connection point 188 at its first end and is mounted to the frame, at least indirectly, at its opposite end. Extension coil spring is configured to put tension on the drive flange 78 pending on whether the flange is in its or disengaged position. The extension coil spring ordinarily biases the drive flange 78 to its disengaged position in which the spring is in its contracted position, which rotates the flange arm 78 in a counter clockwise direction to disengage the tensioner pulley 186 out of its engagement with the drive belt 150. The extension coil spring 190 biases the flange 78 to pivot about the pivot point 184. As will be described in greater detail below, in operation, an operator may pull the link arm 70 via its connection at second end 76 with the drive flange 78 against the biasing force of the spring to pivot the flange arm 78 in a clockwise direction about the pivot point 184, which operatively moves the tensioner pulley 186 into engagement with the drive belt 150.

The drive belt 150 is additionally wrapped around a pulley 192 connected to the crankshaft PTO 84 that is configured to rotate about the crankshaft axis 86. Thus, the drive belt 150 is a looped member that extends around the pulley 192 and then extends upwardly and passes the tensioner pulley and rearwardly to extend back around the pulley 152 on the driveshaft 88 and then upwardly and forwardly back towards the pulley 192 connected to the crankshaft 84.

Figure 8:
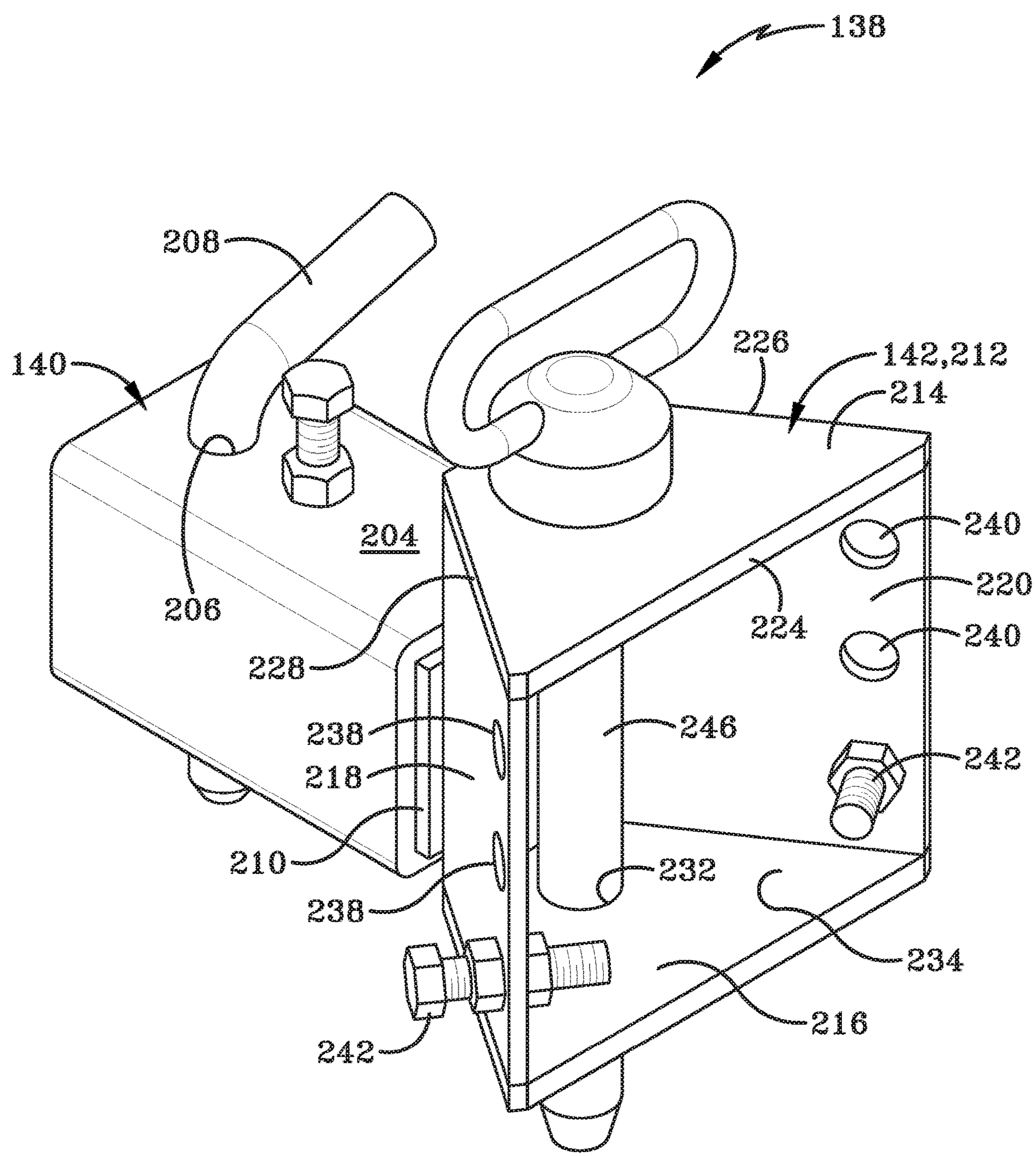
FIG. 8 (FIG. 8) is an assembled perspective view of a hitch assembly for the walk-behind tractor according to another aspect of the present disclosure.
Figure 9:
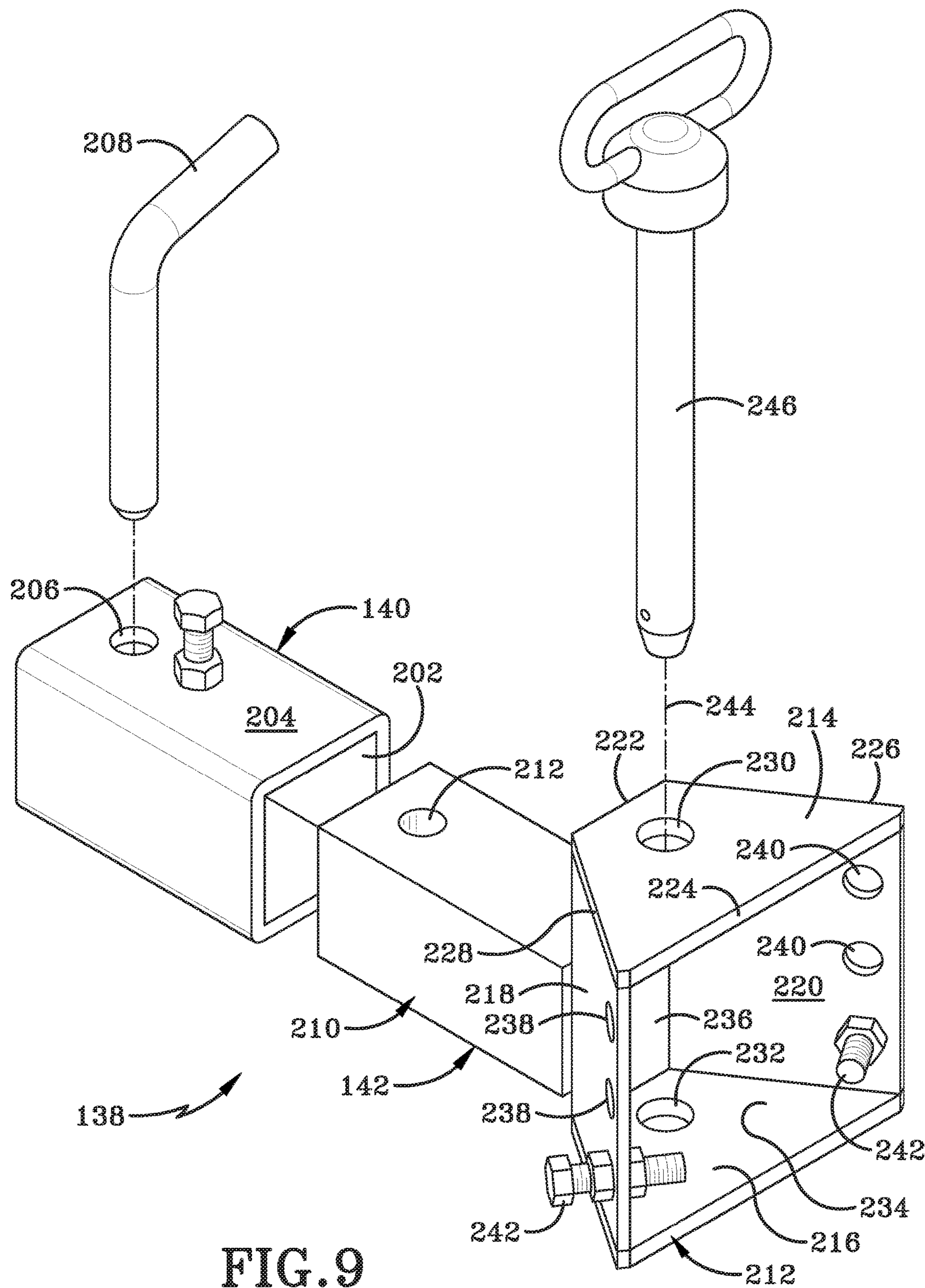
FIG. 9 (FIG. 9) is an exploded perspective view of the hitch assembly of FIG. 8.

FIG. 8 and FIG. 9 depict the hitch assembly 138 in accordance with one aspect of the present disclosure. As indicated previously, hitch assembly 138 includes a receiver 140 and a supplemental flared hitch 142. Receiver 140 is generally formed of a square cross sectional tube having an upper surface, a lower surface, and two side surfaces defining an internal bore 202 therein. Upper surface 204 of receiver 140 may define an aperture 206 configured to receive a pin 208 therethrough. A corresponding aperture may be located in the lower surface opposite the upper surface 204 to allow the pin 208 to extend fully through the bore 202 when the supplemental flared hitch 142 is fully inserted into the receiver bore 202. The supplemental flared hitch 142 includes a squared extension 210 having a length that corresponds to the longitudinal length of the bore such that an aperture 212 formed in the extension 210 aligns with aperture 206 to receive the pin 208 therethrough to couple the extension 210 with the receiver 140. Although the squared configuration is shown of the receiver 140 and the extension 210, other cross sectional configurations are entirely possible provided that the shape of the extension 210 compliments the interior shape of the bore 202. Hitch 142 further includes a flared section 212 that is bound by an upper wall 214, a lower wall 216, a first tapered sidewall 218 and a second tapered sidewall 220. The upper wall 214 includes a leading edge 222 and a trailing edge 224. The leading edge 222 has a shorter length than the trailing edge 224, such that its side edges 226, 228 taper inwardly from the trailing edge 224 to the leading edge 222. The top wall 214 defines a vertically aligned aperture taper inwardly from the trailing edge 224 to the leading edge 222. The top wall 214 defines a vertically aligned aperture 230 that extends fully through the top wall. The lower wall 212 is similarly shaped to the top wall 214 and defines an aperture 232 aligned with the aperture 230 in the top wall 214. The similar shape of the lower wall 216 provides a leading edge having a smaller width than a trailing edge. Sidewalls 218, 220 are rigidly connected to the side edges 228, 226 such that the sidewalls are essentially planar members that are oriented in a manner so as to define a tapering effect from the entrance opening 234 of the flared hitch towards the forward portion thereof defined by a front wall 236. The first sidewall may include transversely aligned apertures 238 that are vertically stacked relative to each other to define transversely aligned through openings through the first sidewall 218. Similarly, the second sidewall 220 may include stacked transversely aligned apertures 240 extending therethrough. Each sidewall

218, 220 may include a set screw 242 extending through at least one of the transversely aligned apertures formed in the respective sidewall. The flared or tapered shape of the interior space of the flared or tapered section 212 will allow bounded pivotal movement about the vertical axis 244 when a pin 246 is inserted through aperture 230 and aperture 232 to pivotably connect and implement to the hitch assembly 138. The tapered shape that is defined by the sidewalls may bound the region within which the implement may pivot when being pulled by the walk-behind tractor 10. The set screws may be used to adjust the mount in which the angle of pivotable rotation is bounded for movement of the implement about the vertical axis 244.

Figure 10:
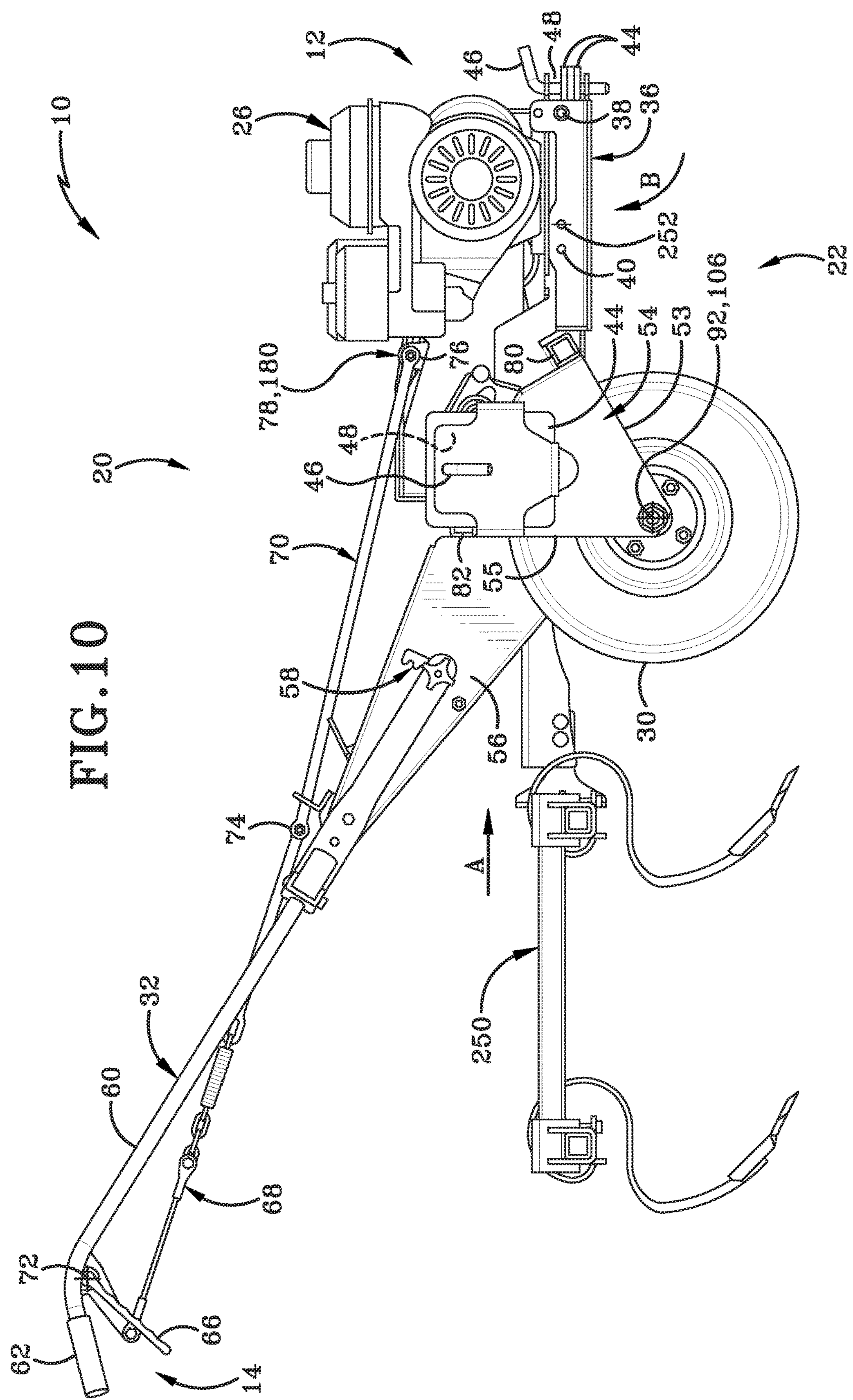
FIG. 10 (FIG. 10) is an operational second side elevation view of connecting an implement to the walk-behind tractor.

Having thus described the structural configuration of the walk-behind tractor 10, 10A in accordance with aspects of the present disclosure, reference will not be made to its operation. In operation and with reference to FIG. 10, an implement 250 may be connected to the walk-behind tractor by inserting a portion of the implement into the hitch assembly 138. The implement 250 may be positioned generally rearward from the first and second ground engaging wheels 28, 30 and centered along the longitudinal center line of the walk-behind tractor 10, 10A. The implement 250 may be moved forwardly in the direction indicated by Arrow A to connect a leading portion of the implement 250 with the hitch assembly 138. The leading portion of the implement 250 may be inserted into the flared portion 212 of the supplemental hitch 142 such that apertures formed in the leading portion of the implement 250 align with apertures 230, 232 to allow pin 246 to be moved along vertical axis 244 to operatively connect the implement 250 to the hitch receiver 138. With the implement 250 connected to the walk-behind tractor 10, 10A, the kickstand may be raised from its grounded position to its operative raised position by pivoting the kickstand 36 about its pivot axis 38 and connecting a pin 252 to lock the kickstand in its raised position after being rotated as indicated by Arrow B.

Figure 11:
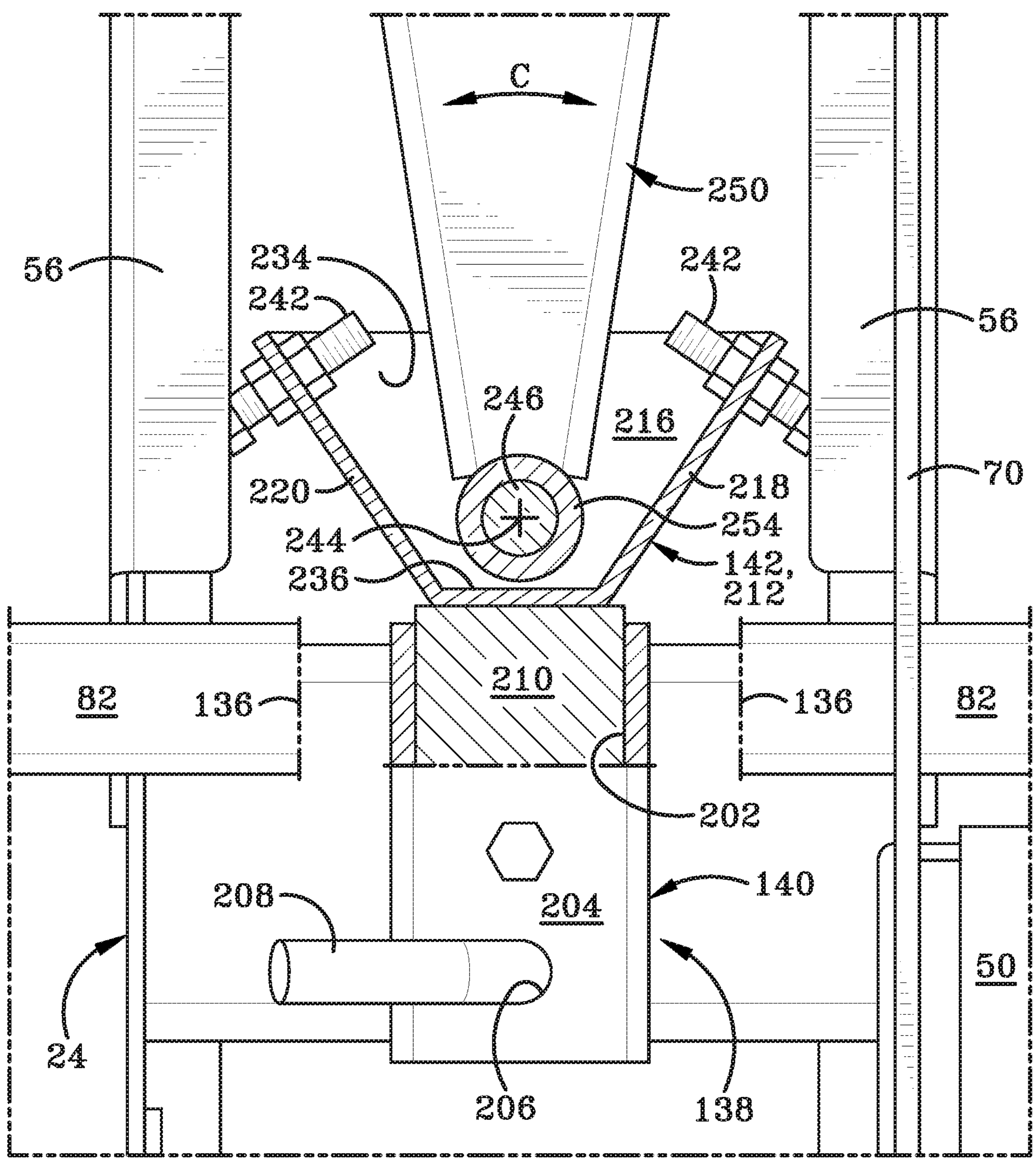
FIG. 11 (FIG. 11) is an operation top plan view of the hitch assembly coupling the implement to the walk-behind tractor.

FIG. 11 depicts the forward end 254 of the implement 250 being connected to the pin 246 within the flared section 212 of hitch 142. The leading portion 254 freely rotates about axis 244 as indicated by Arrow C. When the set screws 242 are removed, the amount of rotation in the direction indicated by Arrow C is bound by the sidewalls 218, 220 of hitch 142. To decrease the amount of range that the implement 250 may pivot about axis 244, the set screws may be inserted through the apertures in the sidewalls 218, 220 to narrowly bound the pivotal movement about axis 244.

Figure 12:
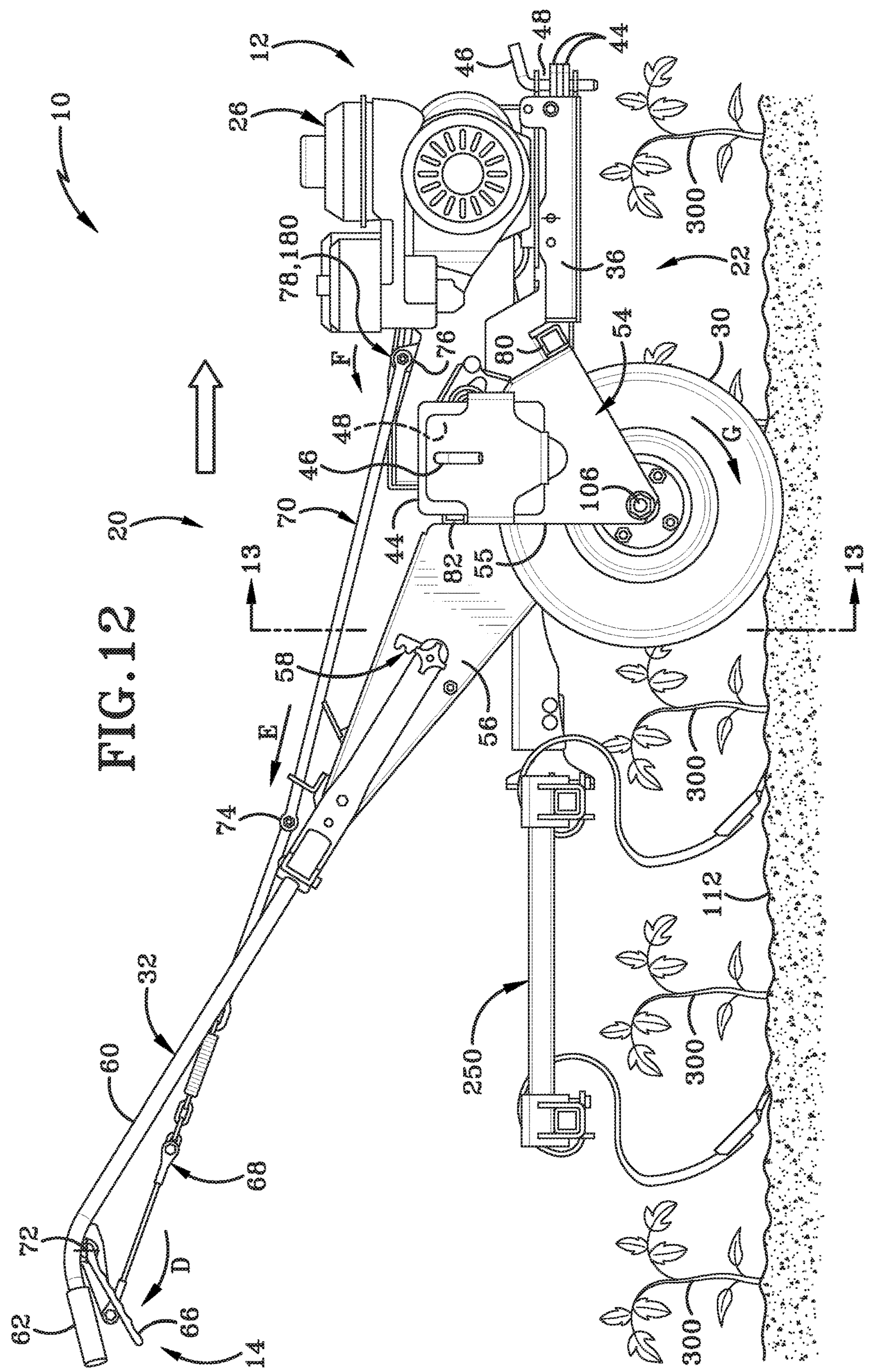
FIG. 12 (FIG. 12) is an operational second side elevation view of the walk-behind tractor pulling the implement relative to plants in the ground.

In operation and with reference to FIG. 7 and FIG. 12, driving the walk-behind tractor 10, 10A is shown. An operator may actuate trigger 66 by moving it rearwardly as indicated by Arrow D. The connection of trigger 66 being moved in the direction of Arrow D moves linkage 68, which in turn pulls link 70 in the direction indicated by Arrow E. Pulling link 70 in the direction of Arrow E causes the flange arm 78 to rotate about pivot axis 184 in the direction of Arrow F against the biasing force of spring 190 that ordinarily biases the tensioner to a disengaged home position. Pivoting the flange arm 78 about pivot axis 184 against the spring tension of spring 190 drives the tensioner pulley 188 into engagement with the drive belt 150 to establish an engaged position or operative position of the tensioner pulley 186.

The crankshaft powered by the engine 26 rotates the crankshaft axis 86 which rotates pulley 192. The rotation of pulley 192 drive the drive belt 150 in its operational loop. When the tensioner pulley 180 engages the drive belt 150, the drive belt 150 has a sufficient amount of tension for the pulley 192 to impart rotational force to pulley 152 connected to the driveshaft 88. Drive belt 150 rotates the driveshaft pulley 152, which imparts rotational movement to the driveshaft 88 about the drive axis 90.

In operation and with reference to FIG. 6, rotational movement of the driveshaft 88 about the drive axis 90 causes the sprocket 170 to turn in conjunction with the driveshaft 88. The rotating sprocket 170 drives the looped mechanism 100, which, in turn, imparts rotational movement to the sprocket 172 operatively connected to the hub on the ground engaging wheels. Rotation of sprocket 172 cause the wheel 28 as indicated by Arrow G. A similar sprocket is connected to loop mechanism 108 on the second ground engaging wheel to drive the same in the same direction as indicated by Arrow G. The rotation of the wheels 28, 30 while engaging ground 112 effectuates translation movement of the tractor 10, 10A to move forwardly in an operational direction while towing implement 250. Notably, the same rotational movement could be used to push an implement if the implement were to be connected to the forward end of the tractor 10, 10A such that the implement would be disposed forward of tractor.

Figure 13:
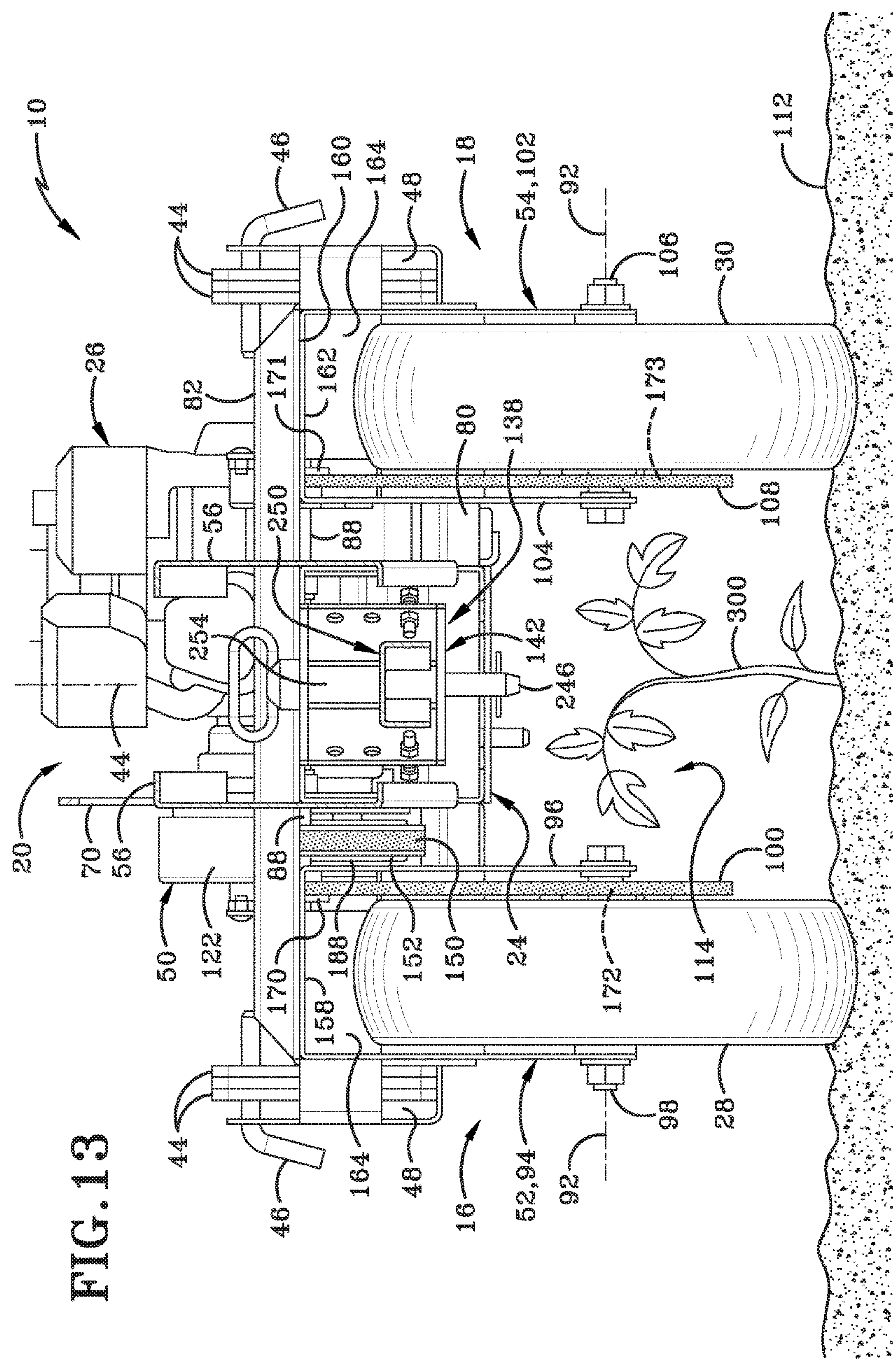
FIG. 13 (FIG. 13) is an operational cross section view take along line 13-13 in FIG. 12 depicting the walk-behind tractor as having an increase height to thereby define a space through which plants pass through and below the walk-behind tractor during operation with the implement in tow.

In operation with reference to FIG. 13, the walk-behind tractor 10 may be moved along a row of plants 300 enabling the plants to pass below the walk-behind tractor 10 within the plant receiving space or region 114 such that the walk-behind tractor 10 does not disrupt or damage the plants 300 passing therebeneath. Accordingly, the walk-behind tractor provides an increased ground clearance through this mechanical configuration to elevate the driveshaft 88 above the wheel axis 92 and the wheels have a sufficient width between them to allow plants 300 to pass therebetween. As indicated previously, other embodiments of the wheel tractors, such as embodiment **10*a* would have an increased width which would accommodate wider plants 300. During construction of walk-behind tractor 10*a*, the couplers may be utilized to increase the length of the driveshaft 88*a* to accommodate the wider width required. As such, the construction of the walk-behind tractor, either 10 or 10*a*, allows the ground engaging wheels to be selected in different positions depending on the desired operation of the walk-behind tractor. Thus, there may be a selected or selective first position of the two ground engaging wheels offset at a first width relative to one another and there may be a selected or selective second position of the ground engaging wheels offset a second width from one another wherein the second width is different from the first width. In this particular instance, the second width may correspond to the embodiment of 10*a*, which is greater than the first width. Thus, selecting the second position widens the wheelbase width between the two ground engaging wheels, which enables the walk-behind tractor 10*a* to traverse atop wider plants than would otherwise be permissible when the walk-behind tractor has wheels in the first position as indicated by tractor 10**.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A walk-behind tractor comprising:
at least two ground engaging wheels that rotate about a wheel axis and the at least two ground engaging wheels are transversely spaced from each other, wherein the wheel axis is at a first height relative to ground;
a driveshaft for the ground engaging wheels located above the wheel axis at a greater second height relative to ground, wherein the driveshaft is coupled with the two ground engaging wheels to rotate the two wheels during operation of the walk-behind tractor;
wherein the second height of the driveshaft being above the wheel axis is adapted to provide an increased ground clearance for the walk-behind tractor for plants to pass below the driveshaft between the two ground engaging wheels during operation of the walk-behind tractor; and
an extension that is coaxially connected to an end of the driveshaft adapted to permit the two ground engaging wheels to be moved to have a greater wheelbase width.

2. The walk-behind tractor of claim 1, wherein the second height is at least 10% greater than the first height.

3. The walk-behind tractor of claim 2, wherein the second height is at least 35% greater than the first height.

4. The walk-behind tractor of claim 1, further comprising:
a first axle coupled to a first ground engaging wheel;
a second axle coupled to a second ground engaging wheel;
wherein the first and second axles are coaxial along the wheel axis below the driveshaft.

5. The walk behind tractor of claim 1, further comprising:
a first sprocket on the driveshaft that is positioned above a second sprocket coupled with a first ground engaging wheel;
a looped member coupling the first sprocket with the second sprocket to effect rotational movement of the driveshaft to be imparted to the first ground engaging wheel, wherein the looped member is selected from a group comprising a chain and a belt.

6. The walk-behind tractor of claim 1, further comprising:
a lower surface of the drive shaft;
a proximal end of a first axle below the lower surface of the drive shaft, wherein the proximal end of the first axle is offset from a longitudinal centerline;
a proximal end of a second axle below the lower surface of the driveshaft, wherien the proximal end of the second axle is offset from the longitudinal centerline opposite the first axle;
a plant receiving area defined by the proximal ends of the first and second axles and the lower surface of the driveshaft, wherein the plant receiving area has a ground clearance height measured from the ground to the lower surface of the driveshaft and a width measured from the proximal end of the first axle to the proximal end of the second axle, and wherein the ground clearance height of the plant receiving area is greater than the width.

7. The walk-behind tractor of claim 1, further comprising:
a plant receiving space defined below the driveshaft and between the two ground engaging wheels having a height of the plant receiving space that is greater than a width thereof.

8. The walk-behind tractor of claim 1, further comprising:
an inverted U-shaped cross-sectional profile of a region below the drive shaft and between the two-ground engaging wheels, and the region is adapted to permit taller plants to pass below the walk-behind tractor when the taller plants would otherwise not pass below a conventional walk-behind tractor with two ground engaging wheels coaxial along a straight axle.

9. The walk-behind tractor of claim 1, further comprising:

a selective first position of the two-ground engaging wheels offset a first width from one another;

a selective second positon of the two-ground engaging wheels offset a second width from one another;

wherein selecting the second position widens a wheelbase width between the two ground engaging wheels adapted to permit the walk-behind tractor to traverse atop wider plants than would otherwise be permissible in the first position.

10. The walk-behind tractor of claim 1, further comprising:

a transverse axis defined by the driveshaft;

a wheel axis about which the first and second ground engaging wheels rotate, wherein the transverse axis of the driveshaft is parallel to and above the wheel axis.

11. The walk-behind tractor of claim 10, further comprising:

a forward displacement of the driveshaft above the wheel axis, wherein the forward displacement is at an angle in a range from about 10 degrees to about 50 degrees.

12. The walk-behind tractor of claim 11, wherein the range of the angle is from about 20 degrees to about 40 degrees.

13. The walk-behind tractor of claim 12, wherein the angel angle is about 30 degrees.

14. The walk-behind tractor of claim 1, further comprising:

a hitch with a flared opening adapted to permit an implement being towed by the walk-behind tractor to pivot within a bounded range of motion.

15. The walk-behind tractor of claim 14, further comprising a set screw on the hitch that extends into the flared opening adapted to decrease the bounded range of motion for the implement to pivot.

16. A walk-behind tractor having an increased ground clearance comprising:

a wheel axis about which at least two ground engaging wheels rotate during operation of the walk-behind tractor, wherein the wheel axis is disposed at a first height above ground;

a ground clearance second height measured between the at least two ground engaging wheels from ground to one of (i) a lower surface of a frame and (ii) a lower surface of a drive assembly;

wherein the ground clearance second height is in a range from 10% to 100% greater than the first height adapted to permit taller plants to pass below the walk-behind tractor during operation thereof than would be permitted if the ground clearance second height equaled the first height;

a selective first position of the two-ground engaging wheels offset a first width from one another;

a selective second positon of the two-ground engaging wheels offset a second width from one another; and wherein selecting the second position widens a wheelbase width between the two ground engaging wheels adapted to permit the walk-behind tractor to traverse atop wider plants than would otherwise be permissible in the first position.

17. A walk-behind tractor comprising:

at least two ground engaging wheels that rotate about a wheel axis and the at least two ground engaging wheels are transversely spaced from each other, wherein the wheel axis is at a first height relative to ground;

a driveshaft for the ground engaging wheels located above the wheel axis at a greater second height relative to ground, wherein the driveshaft is coupled with the two ground engaging wheels to rotate the two wheels during operation of the walk-behind tractor;

wherein the second height of the driveshaft being above the wheel axis is adapted to provide an increased ground clearance for the walk-behind tractor for plants to pass below the driveshaft between the two ground engaging wheels during operation of the walk-behind tractor;

a selective first position of the two-ground engaging wheels offset a first width from one another;

a selective second positon of the two-ground engaging wheels offset a second width from one another; and wherein selecting the second position widens a wheelbase width between the two ground engaging wheels adapted to permit the walk-behind tractor to traverse atop wider plants than would otherwise be permissible in the first position.

18. A walk-behind tractor comprising:

at least two ground engaging wheels that rotate about a wheel axis and the at least two ground engaging wheels are transversely spaced from each other, wherein the wheel axis is at a first height relative to ground;

a driveshaft for the ground engaging wheels located above the wheel axis at a greater second height relative to ground, wherein the driveshaft is coupled with the two ground engaging wheels to rotate the two wheels during operation of the walk-behind tractor;

wherein the second height of the driveshaft being above the wheel axis is adapted to provide an increased ground clearance for the walk-behind tractor for plants to pass below the driveshaft between the two ground engaging wheels during operation of the walk-behind tractor; and a hitch with a flared opening adapted to permit an implement being towed by the walk-behind tractor to pivot within a bounded range of motion.

19. The walk-behind tractor of claim 18, further comprising a set screw on the hitch that extends into the flared opening adapted to decrease the bounded range of motion for the implement to pivot.

20. A walk-behind tractor comprising:

at least two ground engaging wheels that rotate about a wheel axis and the at least two ground engaging wheels are transversely spaced from each other, wherein the wheel axis is at a first height relative to ground;

a driveshaft for the ground engaging wheels located above the wheel axis at a greater second height relative to ground, wherein the driveshaft is coupled with the two ground engaging wheels to rotate the two wheels during operation of the walk-behind tractor;

wherein the second height of the driveshaft being above the wheel axis is adapted to provide an increased ground clearance for the walk-behind tractor for plants to pass below the driveshaft between the two ground engaging wheels during operation of the walk-behind tractor;

a transverse axis defined by the driveshaft;

a wheel axis about which the first and second ground engaging wheels rotate, wherein the transverse axis of the driveshaft is parallel to and above the wheel axis;

and a forward displacement of the driveshaft above the wheel axis, wherein the forward displacement is at an angle in a range from about 10 degrees to about 50 degrees.

21. The walk-behind tractor of claim 20, wherein the range of the angle is from about 20 degrees to about 40 degrees.

22. The walk-behind tractor of claim 21, wherein the angle is about 30 degrees.

* * * * *